United States Patent
Ishii et al.

(10) Patent No.: US 10,633,473 B2
(45) Date of Patent: Apr. 28, 2020

(54) BINDER PARTICLE AGGREGATE FOR ELECTROCHEMICAL DEVICE ELECTRODE, SLURRY COMPOSITION FOR ELECTROCHEMICAL DEVICE ELECTRODE, PRODUCTION METHODS THEREFOR, ELECTRODE FOR ELECTROCHEMICAL DEVICE, AND ELECTROCHEMICAL DEVICE

(71) Applicant: ZEON CORPORATION, Chiyoda-ku Tokyo (JP)

(72) Inventors: Takuya Ishii, Tokyo (JP); Takafumi Sekimoto, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 9 days.

(21) Appl. No.: 16/098,243

(22) PCT Filed: May 9, 2017

(86) PCT No.: PCT/JP2017/017566
§ 371 (c)(1),
(2) Date: Nov. 1, 2018

(87) PCT Pub. No.: WO2017/195784
PCT Pub. Date: Nov. 16, 2017

(65) Prior Publication Data
US 2019/0144586 A1   May 16, 2019

(30) Foreign Application Priority Data

May 13, 2016   (JP) .................................. 2016-097290

(51) Int. Cl.
*H01M 4/13* (2010.01)
*C08F 220/48* (2006.01)
*H01G 11/38* (2013.01)
*H01M 4/139* (2010.01)
(Continued)

(52) U.S. Cl.
CPC ............... *C08F 220/48* (2013.01); *C08J 5/00* (2013.01); *C08J 9/286* (2013.01); *H01G 11/38* (2013.01);
(Continued)

(58) Field of Classification Search
None
See application file for complete search history.

(56) References Cited

U.S. PATENT DOCUMENTS

2013/0280606 A1* 10/2013 Sekine .................. C08F 220/42
 429/211
2013/0330622 A1  12/2013 Sasaki et al.
(Continued)

FOREIGN PATENT DOCUMENTS

JP     2015213049 A    11/2015
WO     2012091001 A1    7/2012
(Continued)

OTHER PUBLICATIONS

Aug. 15, 2017, International Search Report issued in the International Patent Application No. PCT/JP2017/017566.
(Continued)

*Primary Examiner* — Wyatt P McConnell
(74) *Attorney, Agent, or Firm* — Kenja IP Law PC

(57) ABSTRACT

A technique for ensuring the coatability of a slurry composition and also enabling an electrochemical device to exhibit excellent high-voltage cycle characteristics is provided. A binder particle aggregate for an electrochemical device electrode comprises a plurality of binder particles that contain a polymer including 75.0 mol % or more and 99.5 mol % or less of a nitrile group-containing monomer unit, wherein a pore content ratio of the plurality of binder particles is 60% or more.

11 Claims, 3 Drawing Sheets

(51) Int. Cl.
  *H01M 4/04* (2006.01)
  *C08J 5/00* (2006.01)
  *C08J 9/28* (2006.01)
  *H01M 4/62* (2006.01)
  *H01M 10/0525* (2010.01)

(52) U.S. Cl.
  CPC ........... *H01M 4/0404* (2013.01); *H01M 4/13* (2013.01); *H01M 4/139* (2013.01); *H01M 4/622* (2013.01); *H01M 10/0525* (2013.01); *C08F 2800/10* (2013.01); *C08J 2201/0504* (2013.01); *C08J 2333/20* (2013.01); *Y02E 60/13* (2013.01)

(56) References Cited

U.S. PATENT DOCUMENTS

2017/0084923 A1 3/2017 Oh et al.
2017/0104205 A1 4/2017 Ishii et al.

FOREIGN PATENT DOCUMENTS

| WO | 2012115096 A1 | 8/2012 |
| WO | 2014192652 A1 | 12/2014 |
| WO | 2015151525 A1 | 10/2015 |
| WO | 2016013434 A1 | 1/2016 |

OTHER PUBLICATIONS

Sep. 25, 2019, the Extended European Search Report issued by the European Patent Office in the corresponding European Patent Application No. 17796145.5.

Nov. 13, 2018, International Preliminary Report on Patentability issued in the International Patent Application No. PCT/JP2017/017566.

* cited by examiner

BINDER PARTICLE AGGREGATE FOR ELECTROCHEMICAL DEVICE ELECTRODE, SLURRY COMPOSITION FOR ELECTROCHEMICAL DEVICE ELECTRODE, PRODUCTION METHODS THEREFOR, ELECTRODE FOR ELECTROCHEMICAL DEVICE, AND ELECTROCHEMICAL DEVICE

TECHNICAL FIELD

The present disclosure relates to a binder particle aggregate for an electrochemical device electrode, a slurry composition for an electrochemical device electrode, production methods therefor, an electrode for an electrochemical device, and an electrochemical device.

BACKGROUND

Electrochemical devices such as lithium ion secondary batteries and electric double-layer capacitors have characteristics such as compact size, light weight, high energy-density, and the ability to be repeatedly charged and discharged, and are used in a wide range of applications.

For example, an electrode for a lithium ion secondary battery generally includes a current collector and an electrode mixed material layer (positive electrode mixed material layer or negative electrode mixed material layer) formed on the current collector. The electrode mixed material layer is formed, for example, by applying, onto the current collector, a slurry composition containing an electrode active material, a binder, a solvent, and so forth and drying the applied slurry composition.

In recent years, there have been attempts to improve slurry compositions used in the formation of electrode mixed material layers in order to further improve electrochemical device performance.

For example, JP 2015-213049 A (PTL 1) discloses the following technique: A polymer containing a vinyl cyanide unit and an acidic group-containing unit in respective predetermined proportions and having a weight-average molecular weight in a predetermined range is formed in water. The polymer is collected by suction filtration, washed with warm water, and then dried. Subsequently, the dried polymer is mixed with a positive electrode active material as an electrode active material, N-methylpyrrolidone as a solvent, and the like, to produce a slurry composition. According to PTL 1, by using this slurry composition, an electrode having excellent peel strength (adhesion strength between an electrode mixed material layer and a current collector) and flexibility can be produced to thus obtain a non-aqueous secondary battery with improved electrochemical stability.

CITATION LIST

Patent Literature

PTL 1: JP 2015-213049 A

SUMMARY

Technical Problem

With the above-mentioned conventional technique, however, the dried polymer is hard to dissolve in the solvent when producing the slurry composition. The conventional technique thus has the problem in that an agglutinate tends to form in the slurry composition and impair the coatability of the slurry composition. The conventional technique also has the following problem: While electrochemical devices are required to maintain high discharge capacity even when repeatedly charged and discharged at high voltage, discharge capacity decreases significantly when an electrochemical device including an electrode formed using the conventional slurry composition is repeatedly charged and discharged at high voltage. The conventional technique therefore has room for improvement in ensuring the coatability of the slurry composition on the current collector and also enabling the electrochemical device to exhibit excellent high-voltage cycle characteristics.

It could be helpful to provide a means for advantageously solving these problems.

Solution to Problem

Through extensive studies to solve the problems, the inventors focused on the fact that, by granulating a polymer containing a nitrile group-containing monomer unit in a predetermined range of proportion to obtain a binder particle aggregate made up of a plurality of binder particles, a slurry composition including the polymer as a binder can be produced by simple operation. The inventors then discovered that, when observing a binder particle aggregate by a predetermined method and randomly selecting 100 binder particles, such a binder particle aggregate that is observed to have pores (open pores and/or closed pores) in a predetermined number or more of binder particles from among the 100 binder particles has excellent solubility in a solvent. The inventors further discovered that a slurry composition produced using the binder particle aggregate has excellent coatability, and enables an electrochemical device to exhibit excellent high-voltage cycle characteristics.

To advantageously solve the problems stated above, a presently disclosed binder particle aggregate for an electrochemical device electrode comprises a plurality of binder particles that contain a polymer including 75.0 mol % or more and 99.5 mol % or less of a nitrile group-containing monomer unit, wherein a pore content ratio of the plurality of binder particles is 60% or more. Such a binder particle aggregate that is made up of a plurality of binder particles that contain a polymer including a nitrile group-containing monomer unit in the above-mentioned range and have a pore content ratio of the predetermined value or more dissolves favorably in a solvent used in the production of a slurry composition. A slurry composition formed using the binder particle aggregate therefore has excellent coatability. With the use of the slurry composition, an electrode mixed material layer that enables an electrochemical device to exhibit excellent high-voltage cycle characteristics can be formed.

Herein, "including a monomer unit" means that "a repeating unit derived from that monomer is included in a polymer obtained using that monomer". Herein, in the case of a polymer that is produced through copolymerization of a plurality of types of monomers, the "content proportion of a monomer unit" that is formed through polymerization of a given monomer is normally the same as the ratio (charging ratio) of the given monomer among all monomers used in the polymerization of the polymer. The content proportion of each monomer unit in a polymer can be measured using nuclear magnetic resonance (NMR) method such as $^1$H-NMR or $^{13}$C-NMR.

Herein, the "pore content ratio" can be determined as follows: A binder particle aggregate is observed using an optical microscope, and each circular or approximately circular site that is inside the outer edges of any binder particle, has a circumference 60% or more of which is recognizable, and has a major axis-minor axis ratio of 0.3 or more and 1.0 or less and a diameter (maximum diameter) of 3 μm or more is taken to be a pore of the binder particle. The number of pore-containing binder particles in any 100 binder particles is then counted.

Preferably, in the presently disclosed binder particle aggregate for an electrochemical device electrode, a cumulative 10% diameter (D10 diameter) in particle size distribution measurement by laser diffraction is 10 μm or more, and a cumulative 90% diameter (D90 diameter) in particle size distribution measurement by laser diffraction is 300 μm or less. The binder particle aggregate whose D10 diameter is not less than the above-mentioned lower limit and whose D90 diameter is not more than the above-mentioned upper limit has excellent fluidity, and contributes to better solubility of the slurry composition in the solvent. With the use of the binder particle aggregate, the coatability of the slurry composition can be further enhanced, and the high-voltage cycle characteristics of the electrochemical device can be further improved.

Herein, the "particle size distribution measurement" can be performed using a method described in the EXAMPLES section of the present specification.

Preferably, in the presently disclosed binder particle aggregate for an electrochemical device electrode, a ratio (D90 diameter/D10 diameter) of a cumulative 90% diameter (D90 diameter) to a cumulative 10% diameter (D10 diameter) in particle size distribution measurement by laser diffraction is 10 or less. The binder particle aggregate whose D90 diameter/D10 diameter is not more than the above-mentioned upper limit has excellent fluidity. Hence, for example, ratholes or bridges can be prevented when discharging the binder particle aggregate from a storage hopper.

Preferably, in the presently disclosed binder particle aggregate for an electrochemical device electrode, a cumulative 50% diameter (D50 diameter) in particle size distribution measurement by laser diffraction is 20 μm or more and 200 μm or less. The binder particle aggregate whose D50 diameter is in the above-mentioned range has excellent fluidity, and contributes to better solubility of the slurry composition in the solvent. With the use of the binder particle aggregate, the coatability of the slurry composition can be further enhanced, and the high-voltage cycle characteristics of the electrochemical device can be further improved.

Preferably, in the presently disclosed binder particle aggregate for an electrochemical device electrode, the polymer includes 0.3 mol % or more and 8.0 mol % or less of an acidic group-containing monomer unit. As a result of the content proportion of the acidic group-containing monomer unit in the polymer being in the above-mentioned range, the peel strength of the electrode can be improved, and the high-voltage cycle characteristics of the electrochemical device can be further improved.

Preferably, in the presently disclosed binder particle aggregate for an electrochemical device electrode, the polymer includes 0.1 mol % or more and 4.0 mol % or less of a basic group-containing monomer unit. As a result of the content proportion of the basic group-containing monomer unit in the polymer being in the above-mentioned range, the peel strength of the electrode can be improved, and the high-voltage cycle characteristics of the electrochemical device can be further improved.

Preferably, in the presently disclosed binder particle aggregate for an electrochemical device electrode, the polymer includes an acidic group-containing monomer unit and a basic group-containing monomer unit, and a total content proportion of the acidic group-containing monomer unit and the basic group-containing monomer unit in the polymer is 0.8 mol % or more and 10.0 mol % or less. As a result of the total content proportion of the acidic group-containing monomer unit and the basic group-containing monomer unit in the polymer being in the above-mentioned range, the peel strength of the electrode can be improved, and the high-voltage cycle characteristics of the electrochemical device can be further improved.

Preferably, in the presently disclosed binder particle aggregate for an electrochemical device electrode, the polymer includes an acidic group-containing monomer unit and a basic group-containing monomer unit, and a ratio of a content proportion of the basic group-containing monomer unit to a content proportion of the acidic group-containing monomer unit in the polymer by mol is 0.1 or more and 2.0 or less. As a result of the ratio of the content proportion of the basic group-containing monomer unit to the content proportion of the acidic group-containing monomer unit in the polymer being in the above-mentioned range, the peel strength of the electrode can be improved, and the high-voltage cycle characteristics of the electrochemical device can be further improved.

Preferably, in the presently disclosed binder particle aggregate for an electrochemical device electrode, a moisture content ratio is 5.0 mass % or less. The binder particle aggregate whose moisture content ratio is not more than the above-mentioned upper limit has excellent fluidity. Moreover, as a result of the moisture content ratio of the binder particle aggregate being not more than the above-mentioned upper limit, the amount of moisture imported into the electrode can be reduced to further improve the high-voltage cycle characteristics of the electrochemical device, and also suppress expansion of the cell after repeated charging and discharging.

To advantageously solve the problems stated above, a presently disclosed production method for a binder particle aggregate for an electrochemical device electrode is a production method for any of the binder particle aggregates for an electrochemical device electrode described above, and comprises spray drying a slurry for a binder particle containing a polymer and water, the polymer including 75.0 mol % or more and 99.5 mol % or less of a nitrile group-containing monomer unit. Through such a step, a binder particle aggregate for an electrochemical device electrode that has little variation in particle diameter and is made up of a plurality of binder particles whose pore content ratio is a predetermined value or more can be produced efficiently.

To advantageously solve the problems stated above, a presently disclosed slurry composition for an electrochemical device electrode is obtainable by mixing any of the binder particle aggregates for an electrochemical device electrode described above, an electrode active material, and a solvent. With the use of any of the binder particle aggregates for an electrochemical device electrode described above, a slurry composition for an electrochemical device electrode that has excellent coatability and is capable of forming an electrode mixed material layer that enables an electrochemical device to exhibit excellent high-voltage cycle characteristics can be obtained.

To advantageously solve the problems stated above, a presently disclosed production method for a slurry composition for an electrochemical device electrode comprises mixing any of the binder particle aggregates for an electrochemical device electrode described above, an electrode active material, and a solvent. Through such a step, a slurry composition for an electrochemical device electrode that has excellent coatability and is capable of forming an electrode mixed material layer that enables an electrochemical device to exhibit excellent high-voltage cycle characteristics can be produced efficiently.

To advantageously solve the problems stated above, a presently disclosed electrode for an electrochemical device comprises an electrode mixed material layer formed using the slurry composition for an electrochemical device electrode described above. With the use of the slurry composition for an electrochemical device electrode described above, an electrode for an electrochemical device that enables an electrochemical device to exhibit excellent high-voltage cycle characteristics can be obtained.

To advantageously solve the problems stated above, a presently disclosed electrochemical device comprises the electrode for an electrochemical device described above. With the use of the electrode for an electrochemical device described above, an electrochemical device excellent in characteristics such as high-voltage cycle characteristics can be obtained.

Advantageous Effect

It is therefore possible to obtain a binder particle aggregate for an electrochemical device electrode that has excellent solubility in a solvent and can enhance the coatability of a slurry composition and the high-voltage cycle characteristics of an electrochemical device.

It is also possible to obtain a slurry composition for an electrochemical device electrode that has excellent coatability and is capable of forming an electrode mixed material layer that enables an electrochemical device to exhibit excellent high-voltage cycle characteristics.

It is also possible to obtain an electrode for an electrochemical device that enables an electrochemical device to exhibit excellent high-voltage cycle characteristics.

It is also possible to obtain an electrochemical device having excellent high-voltage cycle characteristics.

DETAILED DESCRIPTION

Figure 1:
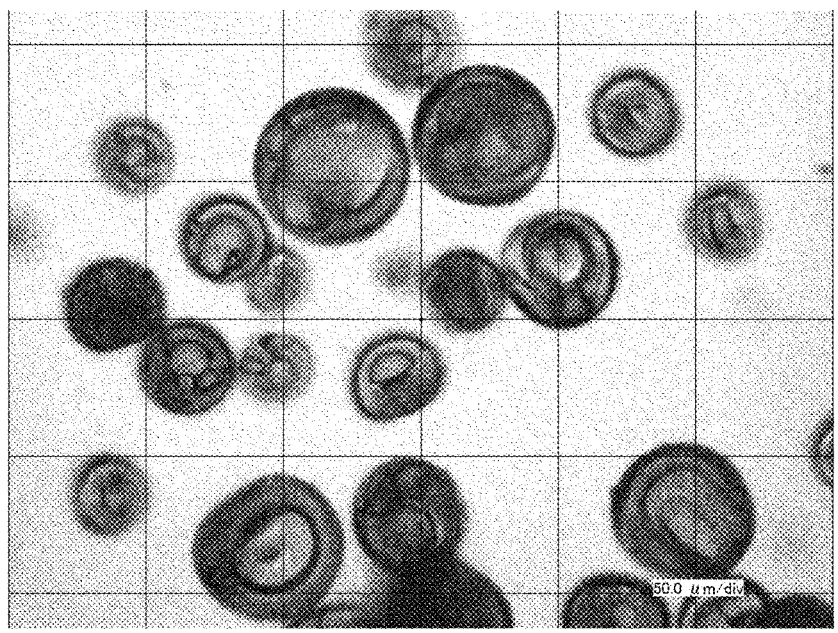
FIG. 1 is an optical micrograph of a binder particle aggregate for an electrochemical device electrode according to Example 1.

One of the disclosed embodiments is described in detail below.

A presently disclosed binder particle aggregate for an electrochemical device electrode can be used in the production of a presently disclosed slurry composition for an electrochemical device electrode. The presently disclosed slurry composition for an electrochemical device electrode produced using the presently disclosed binder particle aggregate for an electrochemical device electrode can be used in the production of an electrode for an electrochemical device such as a lithium ion secondary battery. A presently disclosed electrochemical device uses a presently disclosed electrode for an electrochemical device formed using the presently disclosed slurry composition for an electrochemical device electrode. The presently disclosed binder particle aggregate for an electrochemical device electrode can be produced, for example, by a presently disclosed production method for a binder particle aggregate for an electrochemical device electrode. The presently disclosed slurry composition for an electrochemical device electrode can be produced, for example, by a presently disclosed production method for a slurry composition for an electrochemical device electrode.

(Binder Particle Aggregate for Electrochemical Device Electrode)

The presently disclosed binder particle aggregate for an electrochemical device electrode contains a polymer including 75.0 mol % or more and 99.5 mol % or less of a nitrile group-containing monomer unit. A plurality of binder particles included in the presently disclosed binder particle aggregate have a pore content ratio of 60% or more.

The presently disclosed binder particle aggregate has excellent solubility in a solvent, and a slurry composition produced using the presently disclosed binder particle aggregate has excellent coatability on a current collector. With the use of the slurry composition produced using the presently disclosed binder particle aggregate, an electrode mixed material layer that enables an electrochemical device to exhibit excellent high-voltage cycle characteristics can be formed.

While the reason why the presently disclosed binder particle aggregate has excellent solubility in a solvent and can enhance the coatability of a slurry composition and the high-voltage cycle characteristics of an electrochemical device is not clear, the following reason may be inferred: The plurality of binder particles constituting the presently disclosed binder particle aggregate include binder particles having pores (open pores and/or closed pores) in a predetermined proportion or more. Such pore-containing binder particles have a large contact area with the solvent when dissolved in the solvent, so that the presently disclosed binder particle aggregate dissolves sufficiently in the solvent in a short period of time. This suppresses the formation of an agglutinate in the production of a slurry composition, and makes it possible to form an electrode mixed material layer having a uniform thickness in which the components are dispersed favorably. Moreover, the binder particles in the presently disclosed binder particle aggregate contain the polymer as a binder, and this polymer includes, in a predetermined proportion, a nitrile group-containing monomer unit that can favorably interact with the electrode active material surface while imparting oxidation resistance to the polymer. Therefore, even in the case where charging and discharging are performed repeatedly under high voltage conditions, the polymer can keep covering the electrode active material favorably. Thus, with the use of the presently disclosed binder particle aggregate, the components in the electrode mixed material layer can be dispersed favorably, and the uniformity of the thickness of the electrode mixed material layer and the durability of the electrode mixed material layer under high voltage conditions can be enhanced. This enables the electrochemical device to exhibit excellent high-voltage cycle characteristics.

<Polymer>

The polymer holds components contained in the electrode mixed material layer of the electrode produced by forming the electrode mixed material layer using the slurry composition produced using the binder particle aggregate so that the components do not become detached from the electrode mixed material layer (i.e. functions as a binder).

«Composition of Polymer»

The polymer includes at least a nitrile group-containing monomer unit, and includes at least one type of other monomer unit. Examples of monomer units included in the polymer besides the nitrile group-containing monomer unit include, but are not specifically limited to, an acidic group-containing monomer unit, a basic group-containing monomer unit, a monofunctional ethylenically unsaturated carboxylic acid ester monomer unit, a conjugated diene monomer unit, and an aromatic vinyl monomer unit.

The polymer preferably includes at least one of an acidic group-containing monomer unit and a basic group-containing monomer unit, and more preferably includes both of an acidic group-containing monomer unit and a basic group-containing monomer unit, as other monomer units. The polymer including at least one of an acidic group-containing monomer unit and a basic group-containing monomer unit favorably interacts with the electrode active material via the acidic group and/or the basic group (particularly the acidic group). This enhances the peel strength of the electrode, and further improves the high-voltage cycle characteristics of the electrochemical device. The polymer including both of an acidic group-containing monomer unit and a basic group-containing monomer unit favorably interacts with the electrode active material, as mentioned above. In addition, the acidic group and the basic group interact by an ionic bond or the like between polymer chains constituting the polymer, thus improving the polymer strength. Accordingly, the polymer can stably maintain its adhesiveness even in the case where charging and discharging are performed repeatedly under high voltage conditions. The use of the polymer including both of an acidic group-containing monomer unit and a basic group-containing monomer unit therefore further enhances the peel strength of the electrode, and further improves the high-voltage cycle characteristics of the electrochemical device.

The polymer preferably includes a monofunctional ethylenically unsaturated carboxylic acid ester monomer unit as other monomer units. The polymer including a monofunctional ethylenically unsaturated carboxylic acid ester monomer unit can impart flexibility to the electrode.

[Nitrile Group-containing Monomer Unit]

Examples of nitrile group-containing monomers that can be used to form the nitrile group-containing monomer unit include an α,β-ethylenically unsaturated nitrile monomer. The α,β-ethylenically unsaturated nitrile monomer is not specifically limited other than being an α,β-ethylenically unsaturated compound that has a nitrile group, and may for example be acrylonitrile; an α-halogenoacrylonitrile such as α-chloroacrylonitrile or α-bromoacrylonitrile; or an α-alkylacrylonitrile such as methacrylonitrile or α-ethylacrylonitrile. Of these monomers, the nitrile group-containing monomer is preferably acrylonitrile or methacrylonitrile.

Any one of such nitrile group-containing monomers may be used individually, or any two or more of such nitrile group-containing monomers may be used in combination.

The proportion of the nitrile group-containing monomer unit contained in the polymer needs to be 75.0 mol % or more and 99.5 mol % or less, and is preferably 80.0 mol % or more, more preferably 85.0 mol % or more, further preferably 87.0 mol % or more, particularly preferably 90.0 mol % or more, and most preferably 92.85 mol %, and is preferably 99.0 mol % or less, and more preferably 98.0 mol % or less, where the content proportion of all repeating units in the polymer is taken to be 100 mol %. If the content proportion of the nitrile group-containing monomer unit in the polymer is more than the above-mentioned upper limit, the flexibility of the electrode is impaired. This makes the electrode easy to crack due to, for example, expansion/contraction of the electrode active material associated with repeated charging and discharging. If the content proportion of the nitrile group-containing monomer unit in the polymer is less than the above-mentioned lower limit, the oxidation resistance of the polymer decreases, and also the polymer cannot favorably cover the electrode active material. In addition, the fluidity of the binder particle aggregate decreases. Thus, if the content proportion of the nitrile group-containing monomer unit in the polymer is in the above-mentioned range, the handleability of the binder particle aggregate can be enhanced. Moreover, the polymer with excellent oxidation resistance favorably covers the electrode active material and the flexibility of the electrode is ensured, so that the high-voltage cycle characteristics of the electrochemical device can be improved. Further, the internal resistance of the electrochemical device can be reduced.

[Other Monomer Units]

—Acidic Group-containing Monomer Unit—

Examples of acidic group-containing monomers that can be used to form the acidic group-containing monomer unit include carboxylic acid group-containing monomers, sulfonate group-containing monomers, and phosphate group-containing monomers. By using such monomers as acidic group-containing monomers, the peel strength of the electrode can be enhanced. Moreover, the high-voltage cycle characteristics of the electrochemical device can be further improved. Acidic group-containing monomers may be in salt form such as sodium salt or lithium salt.

Examples of carboxylic acid group-containing monomers include monocarboxylic acids, derivatives of monocarboxylic acids, dicarboxylic acids, acid anhydrides of dicarboxylic acids, and derivatives of dicarboxylic acids.

Examples of monocarboxylic acids include acrylic acid, methacrylic acid, and crotonic acid.

Examples of monocarboxylic acid derivatives include 2-ethylacrylic acid, isocrotonic acid, α-acetoxy acrylic acid, β-trans-aryloxy acrylic acid, and α-chloro-β-E-methoxy acrylic acid.

Examples of dicarboxylic acids include maleic acid, fumaric acid, and itaconic acid.

Examples of derivatives of dicarboxylic acids include methyl maleic acid, dimethyl maleic acid, phenyl maleic acid, chloromaleic acid, dichloromaleic acid, fluoromaleic acid, and maleic acid monoesters such as nonyl maleate, decyl maleate, dodecyl maleate, octadecyl maleate, and fluoroalkyl maleate.

Examples of acid anhydrides of dicarboxylic acids include maleic anhydride, acrylic acid anhydride, methyl maleic anhydride, and dimethyl maleic anhydride.

Furthermore, an acid anhydride that produces a carboxyl group upon hydrolysis can also be used as a carboxylic acid group-containing monomer.

Examples of sulfonate group-containing monomers include styrene sulfonic acid, vinyl sulfonic acid, methyl vinyl sulfonic acid, (meth)allyl sulfonic acid, and 3-allyloxy-2-hydroxypropane sulfonic acid.

In the present disclosure, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

In the present disclosure, "(meth)acryloyl" is used to indicate "acryloyl" and/or "methacryloyl".

Of these, the acidic group-containing monomer is preferably a carboxylic acid group-containing monomer, more preferably (meth)acrylic acid, and further preferably methacrylic acid, in terms of improving the polymerization stability of the polymer, the peel strength of the electrode, and the coatability of the slurry composition. In other words, the acidic group-containing monomer unit is preferably a carboxylic acid group-containing monomer unit, more preferably a (meth)acrylic acid unit, and further preferably a methacrylic acid unit. In the present disclosure, "(meth)acryl" is used to indicate "acryl" and/or "methacryl".

One of such acidic group-containing monomers may be used individually, or two or more of such acidic group-containing monomers may be used in combination in a freely selected ratio.

The proportion of the acidic group-containing monomer unit included in the polymer is preferably 0.3 mol % or more, more preferably 0.5 mol % or more, further preferably 1.0 mol % or more, and particularly preferably 1.2 mol % or more, and is preferably 8.0 mol % or less, more preferably 6.0 mol % or less, further preferably 5.0 mol % or less, and particularly preferably 3.0 mol % or less, where the content proportion of all repeating units in the polymer is taken to be 100 mol %. If the content proportion of the acidic group-containing monomer unit in the polymer is not more than the above-mentioned upper limit, the polymer having a sufficient content proportion of the nitrile group-containing monomer unit can favorably cover the electrode active material. If the content proportion of the acidic group-containing monomer unit in the polymer is not less than the above-mentioned lower limit, the peel strength of the electrode can be improved. Thus, if the content proportion of the acidic group-containing monomer unit in the polymer is in the above-mentioned range, the high-voltage cycle characteristics of the electrochemical device can be further improved.

—Basic Group-containing Monomer Unit—

Examples of basic group-containing monomers that can be used to form the basic group-containing monomer unit include monomers (except the above-mentioned nitrile group-containing monomers) containing a nitrogen-containing functional group, such as amino group-containing monomers and amide group-containing monomers. By using such monomers as basic group-containing monomers, the peel strength of the electrode can be enhanced. Moreover, the high-voltage cycle characteristics of the electrochemical device can be further improved. Basic group-containing monomers may be in salt form such as chloride ions.

Examples of amino group-containing monomers include dimethylaminoethyl (meth)acrylate, diethylaminoethyl (meth)acrylate, aminoethyl vinyl ether, and dimethylaminoethyl vinyl ether. In the present disclosure, "(meth)acrylate" is used to indicate "acrylate" and/or "methacrylate".

Examples of amide group-containing monomers include N-vinylacetamide, (meth)acrylamide, N-methylol (meth)acrylamide, dimethyl (meth)acrylamide, hydroxyethyl (meth)acrylamide, N-methoxymethyl (meth)acrylamide, and dimethylaminopropyl (meth)acrylamide.

Of these, the basic group-containing monomer is preferably dimethylaminoethyl methacrylate, diethylamino methacrylate, or acrylamide, in terms of improving the peel strength of the electrode.

One of such basic group-containing monomers may be used individually, or two or more of such basic group-containing monomers may be used in combination in a freely selected ratio.

The proportion of the basic group-containing monomer unit included in the polymer is preferably 0.1 mol % or more and more preferably 0.3 mol % or more, and is preferably 4.0 mol % or less, more preferably 3.0 mol % or less, further preferably 2.0 mol % or less, and particularly preferably 1.0 mol % or less, where the content proportion of all repeating units in the polymer is taken to be 100 mol %. If the content proportion of the basic group-containing monomer unit in the polymer is not more than the above-mentioned upper limit, the polymer having a sufficient content proportion of the nitrile group-containing monomer unit can favorably cover the electrode active material. If the content proportion of the basic group-containing monomer unit in the polymer is not less than the above-mentioned lower limit, the peel strength of the electrode can be improved. In particular, in the case where the polymer includes both the acidic group-containing monomer unit and the basic group-containing monomer unit, the polymer chains constituting the polymer favorably interact with each other via the basic group and the acidic group, to further improve the peel strength of the electrode. Thus, if the content proportion of the basic group-containing monomer unit in the polymer is in the above-mentioned range, the high-voltage cycle characteristics of the electrochemical device can be further improved.

—Total Content Proportion of Acidic Group-Containing Monomer Unit and Basic Group-Containing Monomer Unit—

The total content proportion of the acidic group-containing monomer unit and the basic group-containing monomer unit in the polymer is preferably 0.8 mol % or more, more preferably 1.0 mol % or more, and further preferably 1.5 mol % or more, and is preferably 10.0 mol % or less, more preferably 7.0 mol % or less, further preferably 5.0 mol % or less, and particularly preferably 3.0 mol % or less, where the content proportion of all repeating units in the polymer is taken to be 100 mol %. If the total content proportion of the two monomer units is not more than the above-mentioned upper limit, a sufficient content proportion of the nitrile group-containing monomer unit can be ensured, allowing the polymer to favorably cover the electrode active material. If the total content proportion of the two monomer units is not less than the above-mentioned lower limit, the peel strength of the electrode can be improved. Thus, if the total content proportion of the two monomer units in the polymer is in the above-mentioned range, the polymer favorably covers the electrode active material, and the peel strength of the electrode is ensured, so that the high-voltage cycle characteristics of the electrochemical device can be further improved.

—Ratio of Content Proportion of Basic Group-containing Monomer Unit to Content Proportion of Acidic Group-containing Monomer Unit—

The ratio (hereafter also simply referred to as "basic group/acidic group ratio") of the content proportion of the basic group-containing monomer unit to the content proportion of the acidic group-containing monomer unit in the polymer by mol is preferably 0.1 or more and more preferably 0.2 or more, and is preferably 2.0 or less, more preferably 1.5 or less, and further preferably 1.0 or less. If the basic group/acidic group ratio is not more than the above-mentioned upper limit, a sufficient amount of the acidic group relative to the basic group can be ensured. Hence, the acidic group in the polymer chains constituting the polymer can interact sufficiently with the basic group at the electrode active material surface, and the polymer can favorably adhere to the electrode active material via the acidic group. If the basic group/acidic group ratio is not less than the above-mentioned lower limit, a sufficient amount of the basic group relative to the acidic group can be ensured. Hence, the basic group in the polymer chains constituting the polymer can interact sufficiently with the acidic group at the electrode active material surface. Thus, if the basic group/acidic group ratio is in the above-mentioned range, the peel strength of the electrode can be ensured while favorably covering the electrode active material with the polymer. Consequently, the high-voltage cycle characteristics of the electrochemical device can be further improved.

—Monofunctional Ethylenically Unsaturated Carboxylic Acid Ester Monomer Unit—

Examples of monofunctional ethylenically unsaturated carboxylic acid ester monomers that can be used to form the monofunctional ethylenically unsaturated carboxylic acid ester monomer unit include monocarboxylic acid esters having one ethylenically unsaturated bond in a molecule. Examples of such monomers include: acrylic acid alkyl esters such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate such as 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate such as 2-ethylhexyl methacrylate, nonyl methacrylate, decyl methacrylate, lauryl methacrylate, n-tetradecyl methacrylate, and stearyl methacrylate.

Of these, n-butyl acrylate is preferable, in terms of imparting flexibility to the electrode while ensuring the reactivity and polymerization stability of the polymer during production. One of such monofunctional ethylenically unsaturated carboxylic acid ester monomers may be used individually, or two or more of such monofunctional ethylenically unsaturated carboxylic acid ester monomers may be used in combination in a freely selected ratio.

The proportion of the monofunctional ethylenically unsaturated carboxylic acid ester monomer unit included in the polymer is preferably 0.2 mol % or more and more preferably 1.0 mol % or more, and is preferably 20.0 mol % or less, more preferably 15.0 mol % or less, further preferably 10.0 mol % or less, and particularly preferably 5.0 mol % or less, where the content proportion of all repeating units in the polymer is taken to be 100 mol %. If the content proportion of the monofunctional ethylenically unsaturated carboxylic acid ester monomer unit in the polymer is not more than the above-mentioned upper limit, the polymer can favorably cover the electrode active material, without excessively swelling in an electrolyte solution. If the content proportion of the monofunctional ethylenically unsaturated carboxylic acid ester monomer unit in the polymer is not less than the above-mentioned lower limit, the flexibility of the electrode can be improved. For example, even in the case where the electrode active material expands/contracts in association with repeated charging and discharging, the electrode can be kept from cracking. Thus, if the content proportion of the monofunctional ethylenically unsaturated carboxylic acid ester monomer unit in the polymer is in the above-mentioned range, the peel strength of the electrode can be ensured.

—Conjugated Diene Monomer Unit—

Examples of conjugated diene monomers that can be used to form the conjugated diene monomer unit include aliphatic conjugated diene monomers such as 1,3-butadiene, 2-methyl-1,3-butadiene, 2,3-dimethyl-1,3-butadiene, 2-chloro-1,3-butadiene, substituted linear conjugated pentadienes, and substituted and side-chain conjugated hexadienes. One of such conjugated diene monomers may be used individually, or two or more of such conjugated diene monomers may be used in combination in a freely selected ratio.

The proportion of the conjugated diene monomer unit included in the polymer is not specifically limited, but is preferably 0.8 mol % or more, and is preferably 10.0 mol % or less, where the content proportion of all repeating units in the polymer is taken to be 100 mol %.

—Aromatic Vinyl Monomer Unit—

Examples of aromatic vinyl monomers that can be used to form the aromatic vinyl monomer unit include styrene, α-methylstyrene, vinyltoluene, and divinyl benzene. One of such aromatic vinyl monomers may be used individually, or two or more of such aromatic vinyl monomers may be used in combination in a freely selected ratio. The monomers included in the above-mentioned acidic group-containing monomers are not included in the aromatic vinyl monomers.

The proportion of the aromatic vinyl monomer unit included in the polymer is not specifically limited, but is preferably 0.8 mol % or more, and is preferably 10.0 mol % or less, where the content proportion of all repeating units in the polymer is taken to be 100 mol %.

«Production of Polymer»

The polymer can be produced as a water dispersion of the polymer, for example through polymerization of a monomer composition containing the above-mentioned monomers in an aqueous solvent. Herein, the content proportion of each monomer in the monomer composition can be set in accordance with the content proportion of the corresponding monomer unit (repeating unit) in the polymer.

The aqueous solvent is not specifically limited as long as the polymer can be dispersed. Water may be used alone, or a mixed solvent of water and another solvent may be used.

No specific limitations are placed on the mode of polymerization and any mode such as solution polymerization, suspension polymerization, bulk polymerization, or emulsion polymerization can be used. Of these, emulsion polymerization of emulsifying monomers in an aqueous solvent together with an emulsifier and polymerizing the monomers using a water-soluble polymerization initiator and suspension polymerization of polymerizing monomers in oil droplets using an oil-soluble polymerization initiator while stirring hard the monomers and a solvent (typically an aqueous solvent) that dissolves the monomers little are preferable. Emulsion polymerization is more preferable, in terms of efficiently producing a binder particle aggregate made up of a plurality of binder particles having a pore content ratio of a predetermined value or more. While the reason why the pore content ratio of the plurality of binder particles contained in the obtained binder particle aggregate (hereafter also simply referred to as "pore content ratio of the binder particle aggregate") is enhanced by employing emulsion polymerization in the production of the polymer is not clear, the following reason may be inferred: In the case where emulsion polymerization is used, a finer polymer (particulate polymer) having, for example, a primary particle diameter of about 50 nm to 500 nm can be produced as compared with the case where suspension polymerization is used. Such a fine polymer tends to have a dense structure in the dried outer shell, in an intermediate stage of spray drying for binder particle aggregate production described later. Moisture remaining inside cannot easily pass through the outer shell having a dense structure during vaporization, and causes part of the outer shell to rupture during vaporization. Therefore, the use of the polymer obtained by emulsion polymerization enables the binder particle aggregate to have many pores.

Examples of polymerization methods that can be used include ionic polymerization, radical polymerization, and living radical polymerization.

The types and amounts of additives such as emulsifier, dispersant, polymerization initiator, and polymerization aid used in the polymerization may be set as appropriate.

<Production Method for Binder Particle Aggregate for Electrochemical Device Electrode>

The method of producing the presently disclosed binder particle aggregate for an electrochemical device electrode is not limited, as long as it is capable of granulating a plurality of binder particles including the above-mentioned polymer and having a pore content ratio of a predetermined value or more. For example, the production of the binder particle aggregate is preferably performed using the presently disclosed production method for a binder particle aggregate for an electrochemical device electrode including a step of spray drying a slurry for a binder particle containing the above-mentioned polymer and water. By spray drying the slurry for a binder particle containing the above-mentioned polymer and water, a binder particle aggregate that has little variation in particle diameter and whose pore content ratio of a plurality of binder particles is a predetermined value or more can be produced efficiently.

«Slurry for Binder Particle»

The slurry for a binder particle used in the spray drying is not particularly limited, as long as it contains the above-mentioned polymer and water. For example, in the case where the polymer is produced as a water dispersion of the polymer, the water dispersion can be directly used as the slurry for a binder particle.

«Spray Drying»

The presently disclosed production method for a binder particle aggregate involves spraying and drying the above-mentioned slurry for a binder particle in hot air. A device used to spray the slurry for a binder particle is, for example, an atomizer. Two types of atomizers, namely, rotary disc type and pressure type, are available.

The rotary disc type turns the slurry for a binder particle into a spray by introducing the slurry for a binder particle into a center portion of a disc that rotates fast and emitting the slurry for a binder particle out of the disc by the centrifugal force of the disc. In the rotary disc type, the rotational speed of the disc is not particularly limited, but is preferably 5,000 rpm or more and more preferably 10,000 rpm or more, and is preferably 30,000 rpm or less and more preferably 25,000 rpm or less.

The pressure type turns the slurry for a binder particle into a spray by pressurizing the slurry for a binder particle to emit it from a nozzle. Examples include pressure nozzle type and pressure binary fluid nozzle type. In the pressure binary fluid nozzle type, the air pressure from an air nozzle (dispersion air pressure) for fine adjustment of the spray of the slurry for a binder particle is not particularly limited, but is preferably 0.01 MPa or more and 0.5 MPa or less.

The hot air temperature during the spray drying is preferably 80° C. or more, more preferably 100° C. or more, and further preferably 120° C. or more, and is preferably 250° C. or less, more preferably 200° C. or less, and further preferably 170° C. or less. If the hot air temperature is not more than the above-mentioned upper limit, blocking between binder particles due to melting of the polymer can be suppressed. If the hot air temperature is not less than the above-mentioned lower limit, the formation of pores in binder particles can be facilitated.

The hot air blowing method in the spray drying is not particularly limited, and may be a known method.

<Properties of Binder Particle Aggregate for Electrochemical Device Electrode>

«Pore Content Ratio»

The presently disclosed binder particle aggregate contains a plurality of binder particles having pores, as illustrated in an optical microscopic image of an example of a binder particle aggregate in FIG. 1. The pores may be any of open pores and closed pores. The term "open pore" denotes a pore connected to the outside, and includes a depression. The term "closed pore" is a pore not connected to the outside but closed within the particle. A binder particle having a closed pore has a hollow structure. It is presumed that, for example, such pores result from swelling when, in the spray drying of the slurry for a binder particle (water dispersion of the polymer), the inside moisture vaporizes while the droplet surface is dried.

The pore content ratio of the presently disclosed binder particle aggregate needs to be 60% or more, and is preferably 70% or more, more preferably 78% or more, particularly preferably 85% or more, and most preferably 90% or more. If the pore content ratio of the binder particle aggregate is less than the above-mentioned lower limit, the solubility of the binder particle aggregate in a solvent decreases. As a result, an agglutinate forms, and the coatability of the slurry composition decreases. This makes it impossible to ensure the high-voltage cycle characteristics of the electrochemical device. No upper limit is placed on the pore content ratio of the binder particle aggregate, and the pore content ratio of the binder particle aggregate may be 100% or less. The pore content ratio of the binder particle aggregate can be increased, for example, by changing the polymer production method and the binder particle aggregate production method. Specifically, the pore content ratio of the obtained binder particle aggregate can be enhanced by using emulsion polymerization in the production of the polymer, as mentioned earlier. Moreover, for example, by increasing the hot air temperature in the spray drying of the slurry for a binder particle, the droplet surface is dried faster, and the formation of the outer shell having a dense structure is facilitated. This increases the frequency of pore formation by vaporization of moisture remaining inside, and enhances the pore content ratio of the obtained binder particle aggregate.

«Particle Diameter»

The cumulative 10% diameter (D10 diameter) of the presently disclosed binder particle aggregate in particle size distribution measurement by laser diffraction is preferably 10 µm or more, more preferably 15 µm or more, further preferably 20 µm or more, and particularly preferably 25 µm or more. If the D10 diameter of the binder particle aggregate is not less than the above-mentioned lower limit, the fluidity of the binder particle aggregate can be ensured. Hence, for example, ratholes or bridges can be prevented when discharging the binder particle aggregate from a storage hopper. If the D10 diameter of the binder particle aggregate is not less than the above-mentioned lower limit, dust is suppressed when handling the binder particle aggregate. Although no upper limit is placed on the D10 diameter of the binder particle aggregate, the D10 diameter of the binder particle aggregate is typically 50 μm or less.

The cumulative 50% diameter (D50 diameter) of the presently disclosed binder particle aggregate in particle size distribution measurement by laser diffraction is preferably 20 μm or more, more preferably 30 μm or more, and further preferably 40 μm or more, and is preferably 200 μm or less, and more preferably 150 μm or less. If the D50 diameter of the binder particle aggregate is not more than the above-mentioned upper limit, the solubility of the binder particle aggregate in a solvent can be improved, and the coatability of the slurry composition can be further enhanced. Moreover, the electrode mixed material layer in which components (e.g. conductive material) are uniformly dispersed is obtained, so that the high-voltage cycle characteristics of the electrochemical device can be further improved. If the D50 diameter of the binder particle aggregate is not less than the above-mentioned lower limit, the fluidity of the binder particle aggregate can be ensured. Hence, for example, ratholes or bridges can be prevented when discharging the binder particle aggregate from a storage hopper.

The cumulative 90% diameter (D90 diameter) of the presently disclosed binder particle aggregate in particle size distribution measurement by laser diffraction is preferably 300 μm or less, more preferably 280 μm or less, further preferably 250 μm or less, and particularly preferably 200 μm or less. If the D90 diameter of the binder particle aggregate is not more than the above-mentioned upper limit, the solubility of the binder particle aggregate in a solvent can be improved, and the coatability of the slurry composition can be further enhanced. Moreover, the electrode mixed material layer in which components (e.g. conductive material) are uniformly dispersed is obtained, so that the high-voltage cycle characteristics of the electrochemical device can be further improved. Although no lower limit is placed on the D90 diameter of the binder particle aggregate, the D90 diameter of the binder particle aggregate is typically 30 μm or more.

The ratio (D90 diameter/D10 diameter) of the cumulative 90% diameter (D90 diameter) to the cumulative 10% diameter (D10 diameter) of the presently disclosed binder particle aggregate in particle size distribution measurement by laser diffraction is preferably 10 or less, more preferably 7 or less, further preferably 5 or less, and particularly preferably 4 or less. If the D90 diameter/D10 diameter is not more than the above-mentioned upper limit, the fluidity of the binder particle aggregate can be ensured. Hence, for example, ratholes or bridges can be prevented when discharging the binder particle aggregate from a storage hopper. Although no lower limit is placed on the D90 diameter/D10 diameter of the binder particle aggregate, the D90 diameter/D10 diameter is typically 1 or more.

The particle diameter (D10 diameter, D50 diameter, D90 diameter) of the binder particle aggregate can be adjusted, for example, by changing the spray conditions when spray drying the slurry for a binder particle. Specifically, in the case of using a rotary disc type atomizer, the particle diameter can be increased by decreasing the rotational speed of the disc. In the case of using a pressure type atomizer, the particle diameter can be increased by decreasing the dispersion air pressure or increasing the orifice diameter (the dimension of the blowout hole of the slurry for a binder particle).

《Moisture Content Ratio》

The moisture content ratio of the presently disclosed binder particle aggregate is preferably 5.0 mass % or less, more preferably 3.0 mass % or less, further preferably 2.0 mass % or less, and particularly preferably 1.0 mass % or less. If the moisture content ratio is not more than the above-mentioned upper limit, binding between binder particles caused by moisture and blocking due to gravity are suppressed, thus ensuring the fluidity of the binder particle aggregate. Moreover, the amount of moisture imported into the electrode can be reduced to further improve the high-voltage cycle characteristics of the electrochemical device, and also suppress the expansion of the cell after repeated charging and discharging. No lower limit is placed on the moisture content ratio of the binder particle aggregate, and the lower limit may be substantially 0 mass % (detection limit or less).

(Slurry Composition for Electrochemical Device Electrode)

The presently disclosed slurry composition for an electrochemical device electrode is obtained by mixing an electrode active material, the above-mentioned binder particle aggregate, a solvent, and optionally a conductive material and other components. In other words, the presently disclosed slurry composition contains the electrode active material, the above-mentioned polymer, and the solvent, and optionally further contains the conductive material and the other components. The presently disclosed slurry composition is produced using the above-mentioned binder particle aggregate, and so has excellent coatability. An electrode mixed material layer formed using the presently disclosed slurry composition enables an electrochemical device to exhibit excellent high-voltage cycle characteristics.

<Electrode Active Material>

The electrode active material is a material that gives and receives electrons in the electrodes of the electrochemical device. For example in the case where the electrochemical device is a lithium ion secondary battery, a material that can occlude and release lithium is usually used as the electrode active material.

The following describes an example in which the slurry composition for an electrochemical device electrode is a slurry composition for a lithium ion secondary battery electrode. However, the present disclosure is not limited to the following example.

Examples of a positive electrode active material for a lithium ion secondary battery include, but are not limited to, known positive electrode active materials such as lithium-containing cobalt oxide ($LiCoO_2$), lithium manganate ($LiMn_2O_4$), lithium-containing nickel oxide ($LiNiO_2$), lithium-containing composite oxide of Co—Ni—Mn (Li(Co Mn Ni)$O_2$), lithium-containing composite oxide of Ni—Mn—Al, lithium-containing composite oxide of Ni—Co—Al, olivine-type lithium iron phosphate ($LiFePO_4$), olivine-type manganese lithium phosphate ($LiMnPO_4$), $Li_2MnO_3$—$LiNiO_2$-based solid solution, lithium-rich spinel compounds represented by $Li_{1+x}Mn_{2-x}O_4$ (0<X<2), $Li[Ni_{0.17}Li_{0.2}Co_{0.07}Mn_{0.56}]O_2$, and $LiNi_{0.5}Mn_{1.5}O_4$.

The blending amount and the particle diameter of the positive electrode active material are not limited, and may be the same as those of conventionally used positive electrode active materials.

Examples of the negative electrode active material for a lithium ion secondary battery include a carbon-based negative electrode active material, a metal-based negative electrode active material, and a negative electrode active material formed by combining these two.

The carbon-based negative electrode active material can be defined as an active material that contains carbon as its main backbone, to which lithium can be inserted (or can be doped). Examples of the carbon-based negative electrode active material include carbonaceous materials and graphite materials.

Examples of the carbonaceous material include graphitizing carbon, and non-graphitizing carbon having a structure close to the amorphous structure typified by glassy carbon.

Examples of the graphitizing carbon include carbon materials made of tar pitch obtained from petroleum or coal. Specific examples include coke, meso-carbon microbeads (MCMB), mesophase pitch-based carbon fiber, and pyrolytic vapor-grown carbon fiber.

Examples of the non-graphitizing carbon include a phenol resin fired body, polyacrylonitrile-based carbon fiber, pseudo-isotropic carbon, a furfuryl alcohol resin fired body (PFA), and hard carbon.

Examples of the graphitizing material include natural graphite and artificial graphite.

Examples of the artificial graphite include an artificial graphite obtained by heat-treating a carbon containing graphitizing carbon mostly at 2800° C. or higher, graphitized MCMB obtained by heat-treating MCMB at 2000° C. or higher, and graphitized mesophase pitch-based carbon fiber obtained by heat-treating mesophase pitch-based carbon fiber at 2000° C. or higher.

The metal-based negative electrode active material is an active material containing metal, the structure of which usually contains an element to which lithium can be inserted. When lithium is inserted, the metal-based negative electrode active material exhibits a theoretical electric capacitance of 500 mAh/g or higher per unit mass. Examples of the metal-based active material include a lithium metal; a simple substance of metal that can form a lithium alloy (e.g., Ag, Al, Ba, Bi, Cu, Ga, Ge, In, Ni, P, Pb, Sb, Si, Sn, Sr, Zn, and Ti); alloys of the simple substance of metal; and oxides, sulfides, nitrides, silicides, carbides, and phosphides of the lithium metal, the simple substance of metal, and the alloys of the simple substance of metal. Of these, an active material containing silicon (silicon-based negative electrode active material) is preferable as the metal-based negative electrode active material. With the use of the silicon-based negative electrode active material, the capacity of the lithium ion secondary battery can be increased.

Examples of the silicon-based negative electrode active material include silicon (Si), a silicon-containing alloy, SiO, $SiO_x$, and a composite material of conductive carbon and a Si-containing material obtained by coating or combining a Si-containing material with conductive carbon. The silicon-based negative electrode active material may be one kind of material used individually, or may be two or more kinds of materials used in combination.

The blending amount and the particle diameter of the negative electrode active material are not limited, and may be the same as those of conventionally used negative electrode active materials.

<Binder Particle Aggregate>

As the binder particle aggregate, the presently disclosed binder particle aggregate for an electrochemical device electrode made up of a plurality of binder particles that contain the above-mentioned polymer and whose pore content ratio is a predetermined value or more is used.

The amount of the binder particle aggregate used in the production of the slurry composition for an electrochemical device electrode is not specifically limited, but is preferably set so that the amount of the polymer in the obtained slurry composition per 100 parts by mass of the electrode active material is 0.3 parts by mass or more and more preferably set so that the amount of the polymer is 1.0 part by mass or more, and is preferably set so that the amount of the polymer is 5.0 parts by mass or less and more preferably set so that the amount of the polymer is 4.0 parts by mass or less. As a result of using the binder particle aggregate in such an amount that limits the amount of the polymer in the slurry composition to the above-mentioned range, the peel strength of the electrode can be enhanced to further improve the high-voltage cycle characteristics of the electrochemical device.

<Solvent>

The solvent for the slurry composition is not specifically limited, but is preferably an organic solvent. Examples of organic solvents that can be used include alcohols such as methanol, ethanol, n-propanol, isopropanol, n-butanol, isobutanol, t-butanol, pentanol, hexanol, heptanol, octanol, nonanol, decanol, and amyl alcohol; ketones such as acetone, methyl ethyl ketone, and cyclohexanone; esters such as ethyl acetate and butyl acetate; ethers such as diethyl ether, dioxane, and tetrahydrofuran; amide-based polar organic solvents such as N,N-dimethylformamide, N,N-dimethylacetamide, and N-methylpyrrolidone (NMP); N,N-dimethylsulfoxide; and aromatic hydrocarbons such as toluene, xylene, chlorobenzene, ortho-dichlorobenzene, and para-dichlorobenzene. One of these solvents may be used individually, or two or more of these solvents may be used as a mixture. As the solvent, aprotic polar solvents such as ketones, esters, amide-based polar organic solvents, and N,N-dimethylsulfoxide are preferable, and NMP is particularly preferable.

<Conductive Material>

The conductive material ensures electrical contact within the electrode active material.

Examples of conductive materials that can be used include conductive carbon materials such as carbon black (e.g. acetylene black, Ketjen Black® (Ketjen black is a registered trademark in Japan, other countries, or both), furnace black), single-walled or multi-walled carbon nanotubes (multi-walled carbon nanotubes include cup stack type), carbon nanohorns, vapor-grown carbon fibers, milled carbon fibers obtained by sintering and then crushing polymer fibers, a single-layer or multilayer graphene, and carbon non-woven fabric sheet obtained by sintering non-woven fabric made of polymer fibers; and various metal fibers or foil.

One of such conductive materials may be used individually, or two or more of such conductive materials may be used in combination.

The content proportion of the conductive material in the slurry composition for an electrochemical device electrode per 100 parts by mass of the electrode active material is preferably 0.1 parts by mass or more, more preferably 0.5 parts by mass or more, and further preferably 1.0 part by mass or more, and is preferably 5.0 parts by mass or less, and more preferably 4.0 parts by mass or less. If the amount of the conductive material is in the above-mentioned range, sufficient electrical contact within the electrode active material can be ensured, thus enabling the electrochemical device to exhibit excellent characteristics (such as output characteristics).

<Other Components>

The slurry composition may contain other components such as a binder other than the above-mentioned predetermined polymer, a reinforcing material, a leveling agent, a viscosity modifier, and an additive for electrolyte solution, in addition to the components described above. The other components are not particularly limited, and may be any commonly known materials. For example, components described in WO 2012/115096 A1 may be used. One of these components may be used individually, or two or more of these components may be used in combination in a freely selected ratio. When using the other components such as a binder other than the above-mentioned predetermined polymer and a reinforcing material, the other components preferably have at least one of an acidic group and a basic group, in order to improve the interaction between the polymer chains of the polymer and the other components in the slurry composition and enhance the strength of the electrode. Examples of binders having an acidic group and/or a basic group include fluorine-containing polymers such as PVDF, hydrogenated nitrile rubber, and particulate polymers insoluble in the solvent of the slurry composition and having an acidic group and/or a basic group.

<Production Method for Slurry Composition for Electrochemical Device Electrode>

The presently disclosed slurry composition for an electrochemical device electrode can be produced, for example, using the presently disclosed production method for a slurry composition for an electrochemical device electrode including at least a step of mixing the binder particle aggregate, the electrode active material, and the solvent. Specifically, the slurry composition can be produced by mixing the above-mentioned components using a mixer such as a ball mill, a sand mill, a bead mill, a pigment disperser, a grinding machine, an ultrasonic disperser, a homogenizer, a planetary-type mixer, or a FILMIX.

The order in which the components are mixed is not limited, and may be any order. Specifically, when producing the slurry composition, the components can be mixed, for example, in any of the following orders (1) to (3):

(1) The components are collectively mixed.

(2) The binder particle aggregate and the solvent are pre-mixed to obtain a polymer solution, and then the electrode active material is added to and mixed with the polymer solution.

(3) The binder particle aggregate and the electrode active material are dry mixed to obtain a dry mixture, and then the solvent is added to and mixed with the dry mixture.

Herein, "dry mixing" denotes mixing with the solid content concentration of the mixture during mixing being more than 90 mass %.

Of these, the components are preferably mixed in the order (3). By mixing the components in the order (3), the binder particles are dispersed in the dry mixture before adding the solvent. Accordingly, clumping can be avoided even when the solvent is added to the dry mixture. This ensures the solubility of the binder particle aggregate, and achieves the production of the slurry composition having excellent coatability in a short period of time. In addition, since the polymer in the binder particles favorably covers the electrode active material in the electrode mixed material layer, the high-voltage cycle characteristics of the electrochemical device can be further improved. In the order (3), in the case of adding a conductive material, the conductive material is preferably added during the dry mixing of the binder particle aggregate and the electrode active material.

(Electrode for Electrochemical Device)

The presently disclosed electrode for an electrochemical device, for example, includes an electrode mixed material layer formed on a current collector using the above-mentioned slurry composition for an electrochemical device electrode. Specifically, the electrode mixed material layer is typically a dried product of the above-mentioned slurry composition for an electrochemical device electrode, and contains at least an electrode active material, the above-mentioned polymer, and optionally a conductive material and other components. Components contained in the electrode mixed material layer are the same as the components contained in the above-mentioned slurry composition for an electrochemical device electrode. The suitable ratios of these components in the electrode mixed material layer are the same as the suitable ratios of these components in the slurry composition.

Since the presently disclosed electrode for an electrochemical device has an electrode mixed material layer formed using the above-mentioned slurry composition for an electrochemical device electrode, the presently disclosed electrode for an electrochemical device enables an electrochemical device to exhibit excellent high-voltage cycle characteristics.

<Production of Electrode for Electrochemical Device>

The electrode mixed material layer of the presently disclosed electrode for an electrochemical device can be formed on the current collector, for example, through a step of applying the above-described slurry composition onto the current collector (application step) and a step of drying the slurry composition that has been applied onto the current collector to form an electrode mixed material layer on the current collector (drying step).

«Application Step»

The slurry composition can be applied onto the current collector by any commonly known method without any specific limitations. Specific examples of application methods that can be used include doctor blading, dip coating, reverse roll coating, direct roll coating, gravure coating, extrusion coating, and brush coating. The slurry composition may be applied onto one side or both sides of the current collector. The thickness of the slurry coating on the current collector after application but before drying may be set as appropriate in accordance with the thickness of the electrode mixed material layer to be obtained after drying.

The current collector onto which the slurry composition is applied is a material having electrical conductivity and electrochemical durability. Specifically, the current collector may, for example, be made of iron, copper, aluminum, nickel, stainless steel, titanium, tantalum, gold, platinum, or the like. One of these materials may be used individually, or two or more of these materials may be used in combination in a freely selected ratio.

«Drying Step»

The slurry composition that has been applied onto the current collector may be dried by any commonly known method without any specific limitations. Examples of drying methods that can be used include drying by warm, hot, or low-humidity air; drying in a vacuum; and drying by irradiation with infrared light, electron beams, or the like. Through drying of the slurry composition on the current collector as described above, an electrode mixed material layer is formed on the current collector, thereby providing an electrode for an electrochemical device that includes the current collector and the electrode mixed material layer.

After the drying step, the electrode mixed material layer may be further subjected to pressing treatment, such as mold pressing or roll pressing. The pressing treatment can improve the peel strength of the electrode. Moreover, by heating to at least the glass-transition temperature of the polymer during the pressing treatment, the peel strength of the electrode can be further improved while further increasing the density of the electrode mixed material layer. Furthermore, when the electrode mixed material layer contains a curable polymer, the polymer is preferably cured after the electrode mixed material layer has been formed.

(Electrochemical Device)

The presently disclosed electrochemical device is a lithium ion secondary battery or an electric double-layer capacitor, without being particularly limited thereto. The presently disclosed electrochemical device is preferably a lithium ion secondary battery. The presently disclosed electrochemical device includes the presently disclosed electrode for an electrochemical device. Such an electrochemical device has excellent characteristics such as high-voltage cycle characteristics.

The following describes an example in which the electrochemical device is a lithium ion secondary battery. However, the present disclosure is not limited to the following example. The lithium ion secondary battery as the presently disclosed electrochemical device includes electrodes (positive electrode and negative electrode), an electrolyte solution, and a separator. Here, either or both of the positive electrode and the negative electrode are the presently disclosed electrode for an electrochemical device.

<Electrode>

An electrode other than the above-mentioned electrode for an electrochemical device usable in the lithium ion secondary battery as the presently disclosed electrochemical device is not particularly limited, and may be a known electrode. Specifically, an electrode other than the above-mentioned electrode for an electrochemical device may be an electrode obtained by forming an electrode mixed material layer on a current collector using a known production method.

<Electrolyte Solution>

The electrolyte solution is normally an organic electrolyte solution in which a supporting electrolyte is dissolved in an organic solvent. For example, a supporting electrolyte for a lithium ion secondary battery is a lithium salt. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable and $LiPF_6$ is particularly preferable as these lithium salts readily dissolve in a solvent and exhibit a high degree of dissociation. The electrolyte may be one type used individually, or may be two or more types combined in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of organic solvents that can be used include: carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having a high permittivity and a wide stable potential region.

The concentration of the electrolyte in the electrolyte solution can be adjusted as needed. Any additive known in the art may be added to the electrolyte solution.

<Separator>

Examples of the separator include, but are not specifically limited to, separators described in JP 2012-204303 A. Of these separators, a fine porous membrane made of polyolefinic resin (polyethylene, polypropylene, polybutene, or polyvinyl chloride) is preferred since such a membrane can reduce the total thickness of the separator, which increases the ratio of the electrode active material in the lithium ion secondary battery, and consequently increases the capacity per unit volume.

<Production Method for Lithium Ion Secondary Battery>

The lithium ion secondary battery according to the present disclosure may be produced, for example, by stacking the positive electrode and the negative electrode with the separator in-between, rolling or folding the resultant stack as necessary in accordance with the battery shape to place the stack in a battery vessel, filling the battery vessel with the electrolyte solution, and sealing the battery vessel. In order to prevent pressure increase inside the secondary battery and occurrence of overcharging or overdischarging, an overcurrent preventing device such as a PTC device or a fuse; an expanded metal; or a lead plate may be provided as necessary. The shape of the secondary battery may for example be a coin type, button type, sheet type, cylinder type, prismatic type, or flat type.

EXAMPLES

The following provides a more specific description of the present disclosure based on examples. However, the present disclosure is not limited to the following examples. In the following description, "%", "parts", and "ppm" used in expressing quantities are by mass, unless otherwise specified.

Moreover, in the case of a polymer that is produced through copolymerization of a plurality of types of monomers, the proportion of a monomer unit in the polymer that is formed through polymerization of a given monomer is normally, unless otherwise specified, the same as the ratio (charging ratio) of the given monomer among all monomers used in polymerization of the polymer.

In the examples and comparative examples, the following methods were used to evaluate the pore content ratio, particle diameter (D10 diameter, D50 diameter, D90 diameter), moisture content ratio, fluidity, and solubility of the binder particle aggregate, the coatability of the slurry composition, and the high-voltage cycle characteristics of the lithium ion secondary battery.

<Pore Content Ratio>

The powder sample was placed on a transparent stage, and, while applying light from the back of the stage, the binder particle aggregate was observed at a magnification of 1000× (except Comparative Example 6 at a magnification of 175×) using an optical microscope (VHX-200 produced by Keyence Corporation). 100 binder particles were randomly selected, and the number of pore-containing binder particles from among these 100 binder particles was counted to determine the pore content ratio.

<Particle Diameter>

The D10 diameter, D50 diameter, and D90 diameter of the binder particle aggregate by volume were measured using a dry-type integral particle diameter distribution by a laser diffraction/scattering particle size distribution measurement device (Microtrac MT3200II by Nikkiso Co., Ltd.), with the pressure of dispersion air during the measurement being 0.02 MPa.

<Moisture Content Ratio>

The binder particle aggregate whose initial weight W1 had been measured was placed into an oven set to 150° C. and dried, and the weight of the binder particle aggregate was measured every 10 minutes. The drying was stopped when the weight change for 10 minutes fell below 0.1%, and the weight W2 after the drying was measured. The moisture content ratio was then measured using the following formula:

Moisture content ratio (%)=(W2−W1)/W1×100.

<Fluidity>

A vessel of 100 ml in inner volume was loosely filled with the binder particle aggregate, and the bulk density d1 was measured using a powder characteristics evaluation device (Powder Tester® (Powder Tester is a registered trademark in Japan, other countries, or both) PT-X produced by Hosokawa Micron Corporation). Next, the vessel loosely filled with the binder particle aggregate was tapped 180 times, and then the bulk density d2 was measured. The degree of compression was calculated using the following formula, and the fluidity was evaluated based on the following criteria. A lower degree of compression indicates better fluidity of the binder particle aggregate:

Degree of compression (%)=(d2−d1)/d2×100.

A: degree of compression of less than 25%
B: degree of compression of 25% or more and less than 30%
C: degree of compression of 30% or more and less than 35%
D: degree of compression of 35% or more.

<Solubility>

130 g of NMP were added into a 250 ml beaker, and a disper blade with a diameter of 3 cm was stirred in the NMP at 1000 rpm. While continuing the stirring, 7.6 g of the binder particle aggregate were added little by little for 1 minute. After the addition was complete, the stirring was stopped every 10 minutes, and the viscosity at 60 rpm was measured using a B-type viscometer (TVB-10 produced by Toki Sangyo). Using viscosity $\eta_X$ after an elapsed time of X minutes (X=0, 10, 20 . . . ) and viscosity $\eta_{X+10}$ after an elapsed time of X+10 minutes, a minimum value of X that limits the viscosity change rate calculated by the following formula to 5% or less was obtained, and evaluated based on the following criteria. A smaller value of X indicates better solubility of the binder particle aggregate in NMP:

Viscosity change rate (%)=($\eta_{X+10}-\eta_X$)/($\eta_X$)×100.

A: X of 20 minutes or less
B: X of 30 minutes or 40 minutes
C: X of 50 minutes or 60 minutes
D: X of 70 minutes or more.

<Coatability>

The coatability of the produced slurry composition for a lithium ion secondary battery was evaluated by a gauge (grind gauge) in accordance with JIS K5600-2-5: 1999, as follows.

The third largest particle size from among the points of occurrence of streaks observed on the gauge was measured. This measurement was performed 6 times, and a maximum value of the measurements was taken to be the particle size of the slurry composition. A smaller particle size indicates better coatability of the slurry composition:

A: particle size of less than 50 μm
B: particle size of 50 μm or more and less than 75 μm
C: particle size of 75 μm or more and less than 100 μm
D: particle size of 100 μm or more.

<High-voltage Cycle Characteristics>

The produced lithium ion secondary battery was subjected to operation of constant voltage/constant current charging of 4.4 V and 1 C and constant current discharging of 3 V and 1 C repeatedly 100 times (100 cycles), in a 45° C. environment. The proportion of the discharge capacity upon completion of 100 cycles to the discharge capacity upon completion of 1 cycle was taken to be the capacity maintenance rate (={(discharge capacity upon completion of 100 cycles)/(discharge capacity upon completion of 1 cycle)}× 100%), and evaluated based on the following criteria. A higher capacity maintenance rate indicates better high-voltage cycle characteristics:

A: capacity retention rate of 90% or more
B: capacity retention rate of 85% or more and less than 90%
C: capacity retention rate of 80% or more and less than 85%
D: capacity retention rate of less than 80%.

Example 1

<Production of Polymer (Emulsion Polymerization)>

85 parts of deionized water and 0.2 parts of sodium dodecylbenzenesulfonate were charged into a reactor A equipped with a mechanical stirrer and a capacitor in a nitrogen atmosphere, and then heated to 55° C. while being stirred. Subsequently, 0.3 parts of potassium persulfate as a water-soluble polymerization initiator were added into the reactor A as a 5.0% aqueous solution. After this, 94.0 parts (97.10 mol %) of acrylonitrile as a nitrile group-containing monomer, 2.0 parts (1.27 mol %) of methacrylic acid as an acidic group-containing monomer, 1.0 part (0.35 mol %) of dimethylaminoethyl methacrylate as a basic group-containing monomer, 3.0 parts (1.28 mol %) of n-butyl acrylate as a monofunctional ethylenically unsaturated carboxylic acid ester monomer, 0.6 parts of sodium dodecylbenzenesulfonate, 0.035 parts of tertiary dodecyl mercaptan, 0.4 parts of polyoxyethylene lauryl ether, and 80 parts of deionized water were added into another vessel B equipped with a mechanical stirrer in a nitrogen atmosphere, and stirred and emulsified to produce a monomer mixed solution. The monomer mixed solution was, in a stirred and emulsified state, added into the reactor A at a constant speed for 5 hours, and reacted until the polymerization conversion rate reached 95%, thus obtaining a water dispersion of the polymer (slurry for a binder particle).

<Production of Binder Particle Aggregate>

The water dispersion of the polymer obtained as described above was subjected to spray drying using a spray dryer (produced by Ohkawara Kakohki Co., Ltd.) under the following conditions: atomizer: rotary disc type (diameter: 65 mm), rotational speed: 13,000 rpm, hot air temperature: 150° C., to produce a binder particle aggregate. The pore content ratio, particle diameter (D10 diameter, D50 diameter, D90 diameter), moisture content ratio, and fluidity of the obtained binder particle aggregate were evaluated. The results are shown in Table 1. FIG. 1 illustrates an optical micrograph of the obtained binder particle aggregate. The optical micrograph is provided with grid-like auxiliary lines of 50 μm×50 μm per square.

<Production of Slurry Composition for Positive Electrode>

95.0 parts of lithium-containing cobalt oxide ($LiCoO_2$) as a positive electrode active material, 3.0 parts of acetylene black (Denka Black in powder form, produced by Denki Kagaku Kogyo K.K.) as a conductive material, and 2.0 parts of the binder particle aggregate obtained as described above were charged into a planetary mixer (produced by PRIMIX Corporation), and dry mixed for 10 minutes at a stirring blade rotational speed of 5 rpm, to obtain a dry mixture. An appropriate amount of NMP was added to the obtained dry mixture, and kneaded for 20 minutes at a stirring blade rotational speed of 60 rpm. Further, an appropriate amount of NMP was added to the obtained mixture, thus producing a slurry composition for a positive electrode. The amount of NMP added to the mixture was adjusted so that the viscosity (the value measured at 60 rpm using a B-type viscometer (TVB-10 produced by Toki Sangyo Co., Ltd.)) of the slurry composition for a positive electrode at a temperature of 25° C. was about 4000 mPa·s.

The coatability of the obtained slurry composition for a positive electrode was evaluated. The results are shown in Table 1.

<Production of Positive Electrode>

An aluminum foil with a thickness of 15 μm was prepared as a current collector. The slurry composition for a positive electrode produced as described above was applied to one side of the aluminum foil so that the coating amount after drying would be 20 mg/cm². The coating on the aluminum foil was then dried for 20 minutes at 60° C. and for 20 minutes at 120° C. Subsequently, the result was heat treated at 120° C. for 2 hours. The same operation was performed on the other side of the aluminum foil, to yield a web of positive electrode. This web of positive electrode was then rolled by roll pressing to produce a positive electrode in the form of a sheet composed of a positive electrode mixed material layer of 3.7 g/cm³ in density on both sides of the current collector. The positive electrode in the form of a sheet was cut to a rectangle of 4.8 cm×50 cm to yield a positive electrode.

<Production of Negative Electrode>

A mixture of 90 parts of spherical artificial graphite (volume-average particle size: 12 μm) and 10 parts of $SiO_x$ (volume-average particle size: 10 μm) as a negative electrode active material, 1 part of styrene butadiene rubber (number-average particle diameter: 180 nm, glass-transition temperature: 10° C.) as a binder, 1 part of carboxymethyl cellulose as a thickener, and an appropriate amount of water were stirred in a planetary mixer to prepare a slurry composition for a negative electrode.

Next, copper foil with a thickness of 15 μm was prepared as a current collector. The slurry composition for a negative electrode produced as described above was applied to one side of the copper foil so that the coating amount after drying would be 12 mg/cm². The coating on the copper foil was then dried for 20 minutes at 50° C. and for 20 minutes at 110° C. Subsequently, the result was heat treated at 150° C. for 2 hours. The same operation was performed on the other side of the copper foil, to yield a web of negative electrode. This web of negative electrode was then rolled by roll pressing to produce a negative electrode in the form of a sheet composed of a negative electrode mixed material layer of 1.8 g/cm³ in density on both sides of the current collector. The negative electrode in the form of a sheet was cut to a rectangle of 5.0 cm×52 cm to yield a negative electrode.

<Production of Lithium Ion Secondary Battery>

The positive electrode and the negative electrode produced as described above were wound around a 20 mm diameter core with a separator (fine porous membrane of polypropylene) of 20 μm in thickness therebetween to yield a wound body. The resulting wound body was compressed in one direction at a rate of 10 mm/s until reaching a thickness of 4.5 mm. The compressed wound body had an elliptical shape in plan view, and the ratio of the major axis to the minor axis (major axis/minor axis) was 7.7.

An electrolyte solution ($LiPF_6$ solution with a concentration of 1.0 M (the solvent being a mixed solution obtained by adding 2 mass % of vinylene carbonate as an additive agent to a mixture yielded by adding fluoroethylene carbonate as an additive agent to dimethyl carbonate in a proportion of fluoroethylene carbonate/dimethyl carbonate=1/2 (mass ratio)) was prepared.

The compressed wound body was housed in an aluminum laminate case along with 3.2 g of electrolyte solution. After connecting a nickel lead wire to a predetermined location of the negative electrode and an aluminum lead wire to a predetermined location of the positive electrode, the opening of the case was thermally sealed to yield a lithium ion secondary battery. The lithium ion secondary battery had a pouch-shape with a width of 35 mm, height of 48 mm, and thickness of 5 mm, and the nominal capacity of the battery was 720 mAh.

The high-voltage cycle characteristics of the produced lithium ion secondary battery were evaluated. The results are shown in Table 1.

Examples 2 to 4, 8 to 10

A water dispersion of a polymer, a binder particle aggregate, a slurry composition for a positive electrode, a positive electrode, a negative electrode, and a lithium ion secondary battery were produced in the same way as Example 1, except that the monomer composition in Table 1 was used in the production of the polymer. Each evaluation was then performed in the same way as Example 1. The results are shown in Table 1.

Example 5

A water dispersion of a polymer, a binder particle aggregate, a slurry composition for a positive electrode, a positive electrode, a negative electrode, and a lithium ion secondary battery were produced in the same way as Example 1, except that the rotational speed of the atomizer (rotary disc type) was changed to 28,000 rpm in the production of the binder particle aggregate. Each evaluation was then performed in the same way as Example 1. The results are shown in Table 1.

Example 6

A water dispersion of a polymer was produced in the same way as Example 1. The obtained water dispersion of the polymer was subjected to spray drying using a spray dryer (produced by Ohkawara Kakohki Co., Ltd.) under the following conditions: atomizer: pressure type (pressure binary fluid nozzle type, OUDT-25 produced by Ohkawara Kakohki Co., Ltd.), dispersion air pressure: 0.03 MPa, hot air temperature: 180° C., to produce a binder particle aggregate. A slurry composition for a positive electrode, a positive electrode, a negative electrode, and a lithium ion secondary battery were produced in the same way as Example 1, except that this binder particle aggregate was used. Each evaluation was then performed in the same way as Example 1. The results are shown in Table 1.

Example 7

A water dispersion of a polymer, a binder particle aggregate, a slurry composition for a positive electrode, a positive electrode, a negative electrode, and a lithium ion secondary battery were produced in the same way as Example 1, except that the hot air temperature was changed to 100° C. in the production of the binder particle aggregate. Each evaluation was then performed in the same way as Example 1. The results are shown in Table 1.

Comparative Example 1

A water dispersion of a polymer, a binder particle aggregate, a slurry composition for a positive electrode, a positive electrode, a negative electrode, and a lithium ion secondary battery were produced in the same way as Example 1, except that the monomer composition in Table 1 was used in the production of the polymer and the hot air temperature was changed to 80° C. in the production of the binder particle aggregate. Each evaluation was then performed in the same way as Example 1. The results are shown in Table 1. The reason of changing the hot air temperature to 80° C. is to suppress blocking of binder particles due to melting of the polymer with a glass-transition temperature decreased as a result of the change of the composition.

Comparative Example 2

A water dispersion of a polymer was produced by the following procedure. The obtained water dispersion of the polymer was used to produce a binder particle aggregate by the following procedure. A slurry composition for a positive electrode, a positive electrode, a negative electrode, and a lithium ion secondary battery were produced in the same way as Example 1, except that this binder particle aggregate was used. Each evaluation was then performed in the same way as Example 1. The results are shown in Table 1.
<Production of Polymer (Suspension Polymerization)>

400 parts of deionized water were charged into a pressure vessel equipped with a stirrer, a thermometer, a cooling pipe, and a nitrogen gas introduction pipe, and, while gently rotating the stirrer, pressure reduction (−600 mmHg) and recovery of normal pressure by nitrogen gas were repeatedly performed 3 times. A dissolved oxygen analyzer was then used to determine that the oxygen concentration of the gas-phase portion of the reaction vessel was 1% or less and the dissolved oxygen in water was 1 ppm or less. Thereafter, 0.2 parts of partially sapofinied polyvinyl alcohol (Gohsenol GH-20 produced by Nippon Synthetic Chemical Industry Co. Ltd., saponification degree: 86.5 mol % to 89.0 mol %) as a dispersant were gradually charged and dispersed well, and then the stirring was continued while heating to 60° C. The state was maintained for 30 minutes, to dissolve the partially sapofinied polyvinyl alcohol.

Following this, 85 parts of acrylonitrile (97.26 mol % when combined with the below-mentioned 10 parts) as a nitrile group-containing monomer, 3 parts (1.89 mol %) of methacrylic acid as an acidic group-containing monomer, 2 parts (0.85 mol %) of n-butyl acrylate as a monofunctional ethylenically unsaturated carboxylic acid ester monomer, and 0.2 parts of t-dodecyl mercaptan as a chain transfer agent were charged at a nitrogen gas flow rate of 0.5 ml/minute, stirred and mixed, and kept at 50±2° C. A liquid obtained by dissolving 0.4 parts of 1,1-azobis(1-acetoxy-1-phenylethane) (OTAZO-15 produced by Otsuka Chemical Co. Ltd., abbreviated as OTAZO-15) as an oil-soluble polymerization initiator in 10 parts of acrylonitrile as a nitrile group-containing monomer was then added, and a reaction was started. After the reaction was promoted at 50±2° C. for 1 hours, the reaction was further performed at 60±2° C. for 2 hours, and then at 80±2° C. for 3 hours. The product was subsequently cooled to 40° C. or less, to obtain a water dispersion of a polymer (slurry for a binder particle).
<Production of Binder Particle Aggregate>

Figure 2:
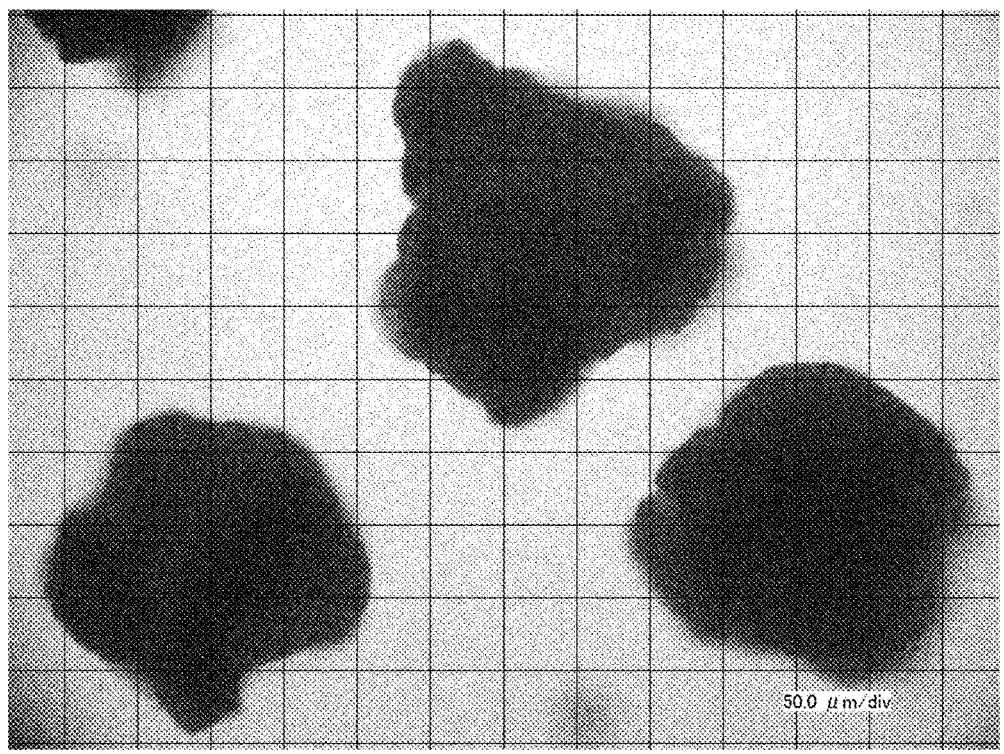
FIG. 2 is an optical micrograph of a binder particle aggregate for an electrochemical device electrode according to Comparative Example 2.

The polymer particles included in the water dispersion of the polymer were collected in filter cloth of 200 mesh, and the collected product was washed with 100 parts of deionized water 3 times. The collected product after the washing was dried at 70° C. for 12 hours with reduced pressure, to obtain a binder particle aggregate. FIG. 2 illustrates an optical micrograph of the obtained binder particle aggregate. The optical micrograph is provided with grid-like auxiliary lines of 50 μm×50 μm per square.

Comparative Example 3

A water dispersion of a polymer, a binder particle aggregate, a slurry composition for a positive electrode, a positive electrode, a negative electrode, and a lithium ion secondary battery were produced in the same way as Comparative Example 2, except that the amount of partially sapofinied polyvinyl alcohol as a dispersant was changed to 2.0 parts in the production of the polymer. Each evaluation was then performed in the same way as Example 1. The results are shown in Table 1.

Comparative Example 4

A water dispersion of a polymer, a binder particle aggregate, a slurry composition for a positive electrode, a positive electrode, a negative electrode, and a lithium ion secondary battery were produced in the same way as Comparative Example 2, except that the operations performed with temperature settings of "50±2° C." and "60±2° C." were all changed to "70° C.±2° C." in the production of the polymer. Each evaluation was then performed in the same way as Example 1. The results are shown in Table 1.

Comparative Example 5

A water dispersion of a polymer was produced in the same way as Comparative Example 4. A slurry composition for a positive electrode, a positive electrode, a negative electrode, and a lithium ion secondary battery were produced in the same way as Comparative Example 4, except that a binder particle aggregate obtained by further grinding, with a mortar, a binder particle aggregate obtained in the same way as Comparative Example 4 was used. Each evaluation was then performed in the same way as Example 1. The results are shown in Table 1.

Comparative Example 6

A water dispersion of a polymer and a binder particle aggregate were produced by the following procedures. A slurry composition for a positive electrode, a positive electrode, a negative electrode, and a lithium ion secondary battery were produced in the same way as Example 1, except that the obtained binder particle aggregate was used. Each evaluation was then performed in the same way as Example 1. The results are shown in Table 1.
<Production of Polymer (Emulsion Polymerization)>

940 parts of distilled water were charged into a pressure vessel equipped with a stirrer, a thermometer, a cooling pipe, and a nitrogen gas introduction pipe, and, while gently rotating the stirrer, pressure reduction (−600 mmHg) and recovery of normal pressure by nitrogen gas were repeatedly performed 3 times. A dissolved oxygen analyzer was then used to determine that the oxygen concentration of the gas-phase portion of the reaction vessel was 1% or less and the dissolved oxygen in water was 1 ppm or less. After heating the contents of the vessel to 60° C., 2.16 parts of ammonium persulfate as a water-soluble polymerization initiator, 6.48 parts of 50% ammonium sulfite as a reductant, and 0.15 parts of 0.1% iron sulfate as a polymerization accelerator were dissolved in 30 parts of distilled water and charged.

A mixture of 99.0 parts (99.38 mol %) of acrylonitrile as a nitrile group-containing monomer and 1.0 part (0.62 mol %) of methacrylic acid as an acidic group-containing monomer was subjected to bubbling with nitrogen gas for 15 minutes, and then the mixture was dripped into the flask for 30 minutes. After the dripping was complete, the contents of the flask were held at the same temperature for 2 hours to promote polymerization, thus obtaining a water dispersion of a polymer.

<Production of Binder Particle Aggregate>

Figure 3:
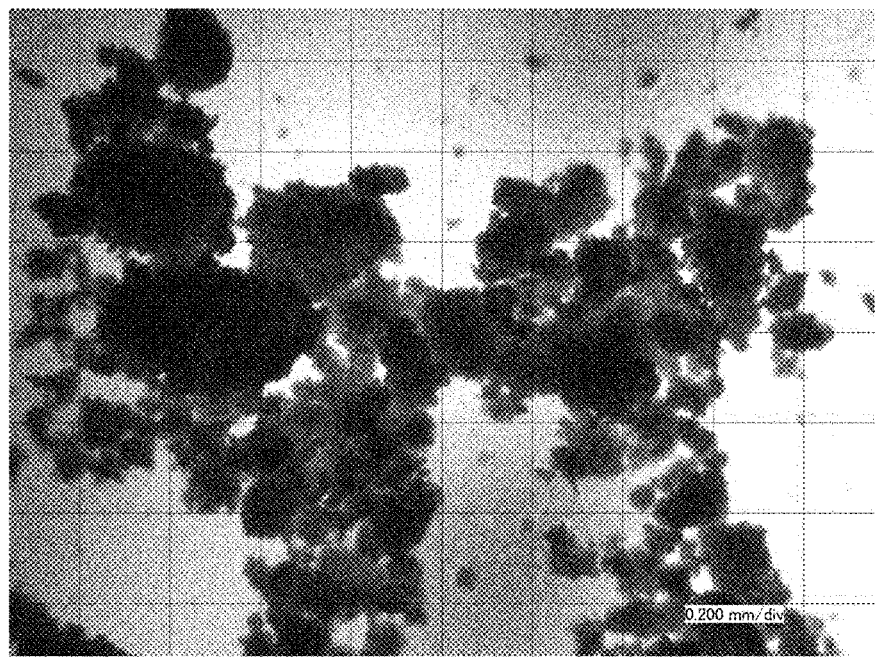
FIG. 3 is an optical micrograph of a binder particle aggregate for an electrochemical device electrode according to Comparative Example 6.

The water dispersion of the polymer obtained as described above was subjected to suction filtration, and the collected product was washed with 10000 parts of warm water of 55° C. The collected product after the washing was dried at 65° C. for 24 hours with reduced pressure, to obtain a binder particle aggregate. FIG. 3 illustrates an optical micrograph of the obtained binder particle aggregate. The optical micrograph is provided with grid-like auxiliary lines of 0.2 mm×0.2 mm per square.

In Table 1, "AN" denotes an acrylonitrile unit, "MAN" denotes a methacrylonitrile unit, "MAA" denotes a methacrylic acid unit, "PM" denotes a 2-methacryloyloxyethyl phosphate unit, "DMMA" denotes a dimethylaminoethyl methacrylate unit, "AAm" denotes an acrylamide unit, "BA" denotes an n-butyl acrylate unit, "MMA" denotes a methyl methacrylate unit, "rotary" denotes rotary disc type, "pressure" denotes pressure binary fluid nozzle type, "LCO" denotes lithium-containing cobalt oxide ($LiCoO_2$), and "AcB" denotes acetylene black.

TABLE 1

| | | | | Example 1 | Example 2 | Example 3 | Example 4 | Example 5 | Example 6 |
|---|---|---|---|---|---|---|---|---|---|
| Slurry composition | Binder particle aggregate | Polymer | Composition | | | | | | |
| | | | Nitrile group-containing monomer unit Type | AN | AN | AN | MAN | AN | AN |
| | | | Content proportion [mol %] | 97.10 | 92.85 | 87.00 | 96.35 | 97.10 | 97.10 |
| | | | Acidic group-containing monomer unit Type | MAA | MAA | MAA | MAA | MAA | MAA |
| | | | Acidic group | Carboxylic acid group | Carboxylic acid group | Carboxylic acid group | Carboxylic acid group | Carboxylic acid group | Carboxylic acid group |
| | | | Content proportion [mol %] | 1.27 | 1.35 | 3.58 | 1.60 | 1.27 | 1.27 |
| | | | Basic group-containing monomer unit Type | DMMA | DMMA | DMMA | DMMA | DMMA | DMMA |
| | | | Basic group | Amino group | Amino group | Amino group | Amino group | Amino group | Amino group |
| | | | Content proportion [mol %] | 0.35 | 0.37 | 0.78 | 0.44 | 0.35 | 0.35 |
| | | | Monofunctional ethylenically unsaturated carboxylic acid ester monomer unit Type | BA | BA | BA | BA | BA | BA |
| | | | Content proportion [mol %] | 1.28 | 5.43 | 8.64 | 1.61 | 1.28 | 1.28 |
| | | | Acidic group-containing monomer unit + basic group-containing monomer unit Total content proportion [mol %] | 1.62 | 1.72 | 4.36 | 2.04 | 1.62 | 1.62 |
| | | | Basic group-containing monomer unit/acidic group-containing monomer unit Molar ratio [—] | 0.28 | 0.27 | 0.22 | 0.28 | 0.28 | 0.28 |
| | | | Polymerization mode | Emulsion polymerization | Emulsion polymerization | Emulsion polymerization | Emulsion polymerization | Emulsion polymerization | Emulsion polymerization |
| | | Pore content ratio [%] | | 94 | 92 | 91 | 93 | 78 | 92 |
| | | Particle diameter | D10 [μm] | 25 | 27 | 32 | 27 | 16 | 34 |
| | | | D50 [μm] | 41 | 45 | 49 | 45 | 28 | 121 |
| | | | D90 [μm] | 68 | 72 | 78 | 68 | 63 | 203 |
| | | | D90/D10 [—] | 2.7 | 2.7 | 2.4 | 2.5 | 3.9 | 6.0 |
| | | Moisture content ratio [mass %] | | 0.8 | 0.9 | 0.9 | 1.1 | 0.6 | 1.3 |
| | | Production (collection) method for binder particle aggregate | | Spray drying | Spray drying | Spray drying | Spray drying | Spray drying | Spray drying |
| | | Atomizer (spray drying) | | Rotary | Rotary | Rotary | Rotary | Rotary | Pressure |
| | | Rotational speed (rotary disc type) [rpm] | | 13000 | 13000 | 13000 | 13000 | 28000 | — |
| | | Dispersion air pressure (pressure binary fluid nozzle type) [MPa] | | — | — | — | — | — | 0.03 |
| | | Hot air temperature of spray drying [° C.] | | 150 | 150 | 150 | 150 | 150 | 180 |
| | | Blending amount [parts by mass] | | 2.0 | 2.0 | 2.0 | 2.0 | 2.0 | 2.0 |
| | Positive electrode | Type | | LCO | LCO | LCO | LCO | LCO | LCO |
| | | Blending amount [parts by mass] | | 95.0 | 95.0 | 95.0 | 95.0 | 95.0 | 95.0 |
| | Conductive material | Type | | AcB | AcB | AcB | AcB | AcB | AcB |
| | | Blending amount [parts by mass] | | 3.0 | 3.0 | 3.0 | 3.0 | 3.0 | 3.0 |
| Evaluation | | Fluidity | | A | A | B | A | B | A |
| | | Solubility | | A | A | A | A | A | B |
| | | Coatability | | A | A | A | A | A | A |
| | | High-voltage cycle characteristics | | A | A | B | A | A | B |

TABLE 1-continued

| | | | | Example 7 | Example 8 | Example 9 | Example 10 | Comparative Example 1 |
|---|---|---|---|---|---|---|---|---|
| Slurry composition | Binder particle aggregate | Polymer | Composition | Nitrile group-containing monomer unit | Type | AN | AN | AN | AN | AN |
| | | | | Content proportion [mol %] | 97.10 | 97.80 | 96.69 | 85.67 | 68.17 |
| | | | Acidic group-containing monomer unit | Type | MAA | PM | MAA | MAA | MAA |
| | | | | Acidic group | Carboxylic acid group | Phosphate group | Carboxylic acid group | Carboxylic acid group | Carboxylic acid group |
| | | | | Content proportion [mol %] | 1.27 | 0.56 | 1.27 | 5.06 | 1.68 |
| | | | Basic group-containing monomer unit | Type | DMMA | DMMA | AAm | DMMA | DMMA |
| | | | | Basic group | Amino group | Amino group | Amide group | Amino group | Amino group |
| | | | | Content proportion [mol %] | 0.35 | 0.35 | 0.77 | 1.98 | 0.46 |
| | | | Monofunctional ethylenically unsaturated carboxylic acid ester monomer unit | Type | BA | BA | BA | BA | BA + MMA |
| | | | | Content proportion [mol %] | 1.28 | 1.29 | 1.27 | 7.29 | 15.24 + 14.45 |
| | | | Acidic group-containing monomer unit + basic group-containing monomer unit | Total content proportion [mol %] | 1.62 | 0.91 | 2.04 | 7.04 | 2.14 |
| | | | Basic group-containing monomer unit/acidic group-containing monomer unit | Molar ratio [—] | 0.28 | 0.63 | 0.61 | 0.39 | 0.27 |
| | | | Polymerization mode | | Emulsion polymerization | Emulsion polymerization | Emulsion polymerization | Emulsion polymerization | Emulsion polymerization |
| | | Pore content ratio [%] | | | 86 | 95 | 93 | 90 | 70 |
| | Particle diameter | D10 [μm] | | | 30 | 27 | 28 | 31 | 36 |
| | | D50 [μm] | | | 47 | 44 | 47 | 52 | 57 |
| | | D90 [μm] | | | 70 | 68 | 73 | 80 | 81 |
| | | D90/D10 [—] | | | 2.3 | 2.5 | 2.6 | 2.6 | 2.3 |
| | Moisture content ratio [mass %] | | | | 2.8 | 1.2 | 0.9 | 1.0 | 2.5 |
| | Production (collection) method for binder particle aggregate | | | | Spray drying | Spray drying | Spray drying | Spray drying | Spray drying |
| | Atomizer (spray drying) | | | | Rotary | Rotary | Rotary | Rotary | Rotary |
| | Rotational speed (rotary disc type) [rpm] | | | | 13000 | 13000 | 13000 | 13000 | 13000 |
| | Dispersion air pressure (pressure binary fluid nozzle type) [MPa] | | | | — | — | — | — | — |
| | Hot air temperature of spray drying [° C.] | | | | 100 | 150 | 150 | 150 | 80 |
| | Blending amount [parts by mass] | | | | 2.0 | 2.0 | 2.0 | 2.0 | 2.0 |
| | Positive electrode | Type | | | LCO | LCO | LCO | LCO | LCO |
| | | Blending amount [parts by mass] | | | 95.0 | 95.0 | 95.0 | 95.0 | 95.0 |
| | Conductive material | Type | | | AcB | AcB | AcB | AcB | AcB |
| | | Blending amount [parts by mass] | | | 3.0 | 3.0 | 3.0 | 3.0 | 3.0 |
| Evaluation | Fluidity | | | | A | A | A | B | C |
| | Solubility | | | | A | A | A | A | B |
| | Coatability | | | | A | B | A | B | B |
| | High-voltage cycle characteristics | | | | B | A | A | B | D |

TABLE 1-continued

| | | | | Comparative Example 2 | Comparative Example 3 | Comparative Example 4 | Comparative Example 5 | Comparative Example 6 |
|---|---|---|---|---|---|---|---|---|
| Slurry composition | Binder particle aggregate | Polymer | Composition | Nitrile group-containing monomer unit | Type | AN | AN | AN | AN | AN |
| | | | | Content proportion [mol %] | 97.26 | 97.26 | 97.26 | 97.26 | 99.38 |
| | | | Acidic group-containing monomer unit | Type | MAA | MAA | MAA | MAA | MAA |
| | | | | Acidic group | Carboxylic acid group | Carboxylic acid group | Carboxylic acid group | Carboxylic acid group | Carboxylic acid group |
| | | | | Content proportion [mol %] | 1.89 | 1.89 | 1.89 | 1.89 | 0.62 |
| | | | Basic group-containing monomer unit | Type | — | — | — | — | — |
| | | | | Basic group | — | — | — | — | — |
| | | | | Content proportion [mol %] | — | — | — | — | — |
| | | | Monofunctional ethylenically unsaturated carboxylic acid ester monomer unit | Type | BA | BA | BA | BA | — |
| | | | | Content proportion [mol %] | 0.85 | 0.85 | 0.85 | 0.85 | — |
| | | | Acidic group-containing monomer unit + basic group-containing monomer unit | Total content proportion [mol %] | 1.89 | 1.89 | 1.89 | 1.89 | 0.62 |
| | | | Basic group-containing monomer unit/acidic group-containing monomer unit | Molar ratio [—] | — | — | — | — | — |
| | | | Polymerization mode | | Suspension polymerization | Suspension polymerization | Suspension polymerization | Suspension polymerization | Emulsion polymerization |
| | | Pore content ratio [%] | | 0 | 0 | 0 | 0 | 0 |
| | Particle diameter | D10 [µm] | | 62 | 4 | 253 | 6 | 33.4 |
| | | D50 [µm] | | 137 | 17 | 392 | 48 | 113 |
| | | D90 [µm] | | 206 | 25 | 1638 | 88 | 649 |
| | | D90/D10 [—] | | 3.3 | 6.3 | 6.5 | 14.7 | 19.4 |
| | Moisture content ratio [mass %] | | | 0.2 | 0.2 | 0.2 | 0.2 | 0.2 |
| | Production (collection) method for binder particle aggregate | | | Filtration | Filtration | Filtration | Grinding after filtration | Filtration |
| | Atomizer (spray drying) | | | — | — | — | — | — |
| | Rotational speed (rotary disc type) [rpm] | | | — | — | — | — | — |
| | Dispersion air pressure (pressure binary fluid nozzle type) [MPa] | | | — | — | — | — | — |
| | Hot air temperature of spray drying [° C.] | | | — | — | — | — | — |
| | | Blending amount [parts by mass] | | 2.0 | 2.0 | 2.0 | 2.0 | 2.0 |
| | Positive electrode | Type | | LCO | LCO | LCO | LCO | LCO |
| | | Blending amount [parts by mass] | | 95.0 | 95.0 | 95.0 | 95.0 | 95.0 |
| | Conductive material | Type | | AcB | AcB | AcB | AcB | AcB |
| | | Blending amount [parts by mass] | | 3.0 | 3.0 | 3.0 | 3.0 | 3.0 |
| Evaluation | Fluidity | | | A | D | A | D | D |
| | Solubility | | | D | C | D | D | C |
| | Coatability | | | D | C | D | D | C |
| | High-voltage cycle characteristics | | | D | C | D | D | C |

The results in Table 1 demonstrate the following: In Examples 1 to 10 using a binder particle aggregate made up of a plurality of binder particles containing a polymer including a nitrile group-containing monomer unit in a predetermined proportion and having a pore content ratio of a predetermined value or more, a binder particle aggregate with excellent fluidity and solubility in a solvent, a slurry composition for a positive electrode with excellent coatability, and a lithium ion secondary battery with excellent high-voltage cycle characteristics were able to be produced.

On the other hand, in Comparative Example 1 using a binder particle aggregate made up of a plurality of binder particles containing a polymer including a nitrile group-containing monomer unit in a lower proportion, the fluidity of the binder particle aggregate and the high-voltage cycle characteristics of the lithium ion secondary battery decreased.

In Comparative Examples 2 to 6 using a binder particle aggregate made up of a plurality of binder particles having a pore content ratio of less than the predetermined value, the solubility of the binder particle aggregate in a solvent, the coatability of the slurry composition for a positive electrode, and the high-voltage cycle characteristics of the lithium ion secondary battery decreased. Of Comparative Examples 2 to 6, Comparative Examples 2 and 4 having a larger particle diameter (D10 diameter, D50 diameter, D90 diameter) of the binder particle aggregate were poor in the above-mentioned categories, but ensured excellent fluidity of the binder particle aggregate. Meanwhile, Comparative Example 3 having a small particle diameter (D10 diameter, D50 diameter, D90 diameter) of the binder particle aggregate and Comparative Example 6 having a binder particle aggregate obtained through filtration after emulsion polymerization were poor not only in the above-mentioned categories but also in the fluidity of the binder particle aggregate. The decrease of the fluidity in Comparative Example 6 was considered to be caused by a wide particle diameter distribution of binder particles and also by the distorted, non-spherical shapes of binder particles.

INDUSTRIAL APPLICABILITY

It is therefore possible to obtain a binder particle aggregate for an electrochemical device electrode that has excellent solubility in a solvent and can enhance the coatability of a slurry composition and the high-voltage cycle characteristics of an electrochemical device.

It is also possible to obtain a slurry composition for an electrochemical device electrode that has excellent coatability and is capable of forming an electrode mixed material layer that enables an electrochemical device to exhibit excellent high-voltage cycle characteristics.

The invention claimed is:

1. A binder particle aggregate for an electrochemical device electrode, comprising
a plurality of binder particles that contain a polymer including 75.0 mol % or more and 99.5 mol % or less of a nitrile group-containing monomer unit,
wherein a pore content ratio of the plurality of binder particles is 60% or more.

2. The binder particle aggregate for an electrochemical device electrode according to claim 1,
wherein a cumulative 10% diameter (D10 diameter) in particle size distribution measurement by laser diffraction is 10 µm or more, and a cumulative 90% diameter (D90 diameter) in particle size distribution measurement by laser diffraction is 300 µm or less.

3. The binder particle aggregate for an electrochemical device electrode according to claim 1,
wherein a ratio (D90 diameter/D10 diameter) of a cumulative 90% diameter (D90 diameter) to a cumulative 10% diameter (D10 diameter) in particle size distribution measurement by laser diffraction is 10 or less.

4. The binder particle aggregate for an electrochemical device electrode according to claim 1,
wherein a cumulative 50% diameter (D50 diameter) in particle size distribution measurement by laser diffraction is 20 µm or more and 200 µm or less.

5. The binder particle aggregate for an electrochemical device electrode according to claim 1,
wherein the polymer includes 0.3 mol % or more and 8.0 mol % or less of an acidic group-containing monomer unit.

6. The binder particle aggregate for an electrochemical device electrode according to claim 1,
wherein the polymer includes 0.1 mol % or more and 4.0 mol % or less of a basic group-containing monomer unit.

7. The binder particle aggregate for an electrochemical device electrode according to claim 1,
wherein the polymer includes an acidic group-containing monomer unit and a basic group-containing monomer unit, and a total content proportion of the acidic group-containing monomer unit and the basic group-containing monomer unit in the polymer is 0.8 mol % or more and 10.0 mol % or less.

8. The binder particle aggregate for an electrochemical device electrode according to claim 1,
wherein the polymer includes an acidic group-containing monomer unit and a basic group-containing monomer unit, and a ratio of a content proportion of the basic group-containing monomer unit to a content proportion of the acidic group-containing monomer unit in the polymer by mol is 0.1 or more and 2.0 or less.

9. The binder particle aggregate for an electrochemical device electrode according to claim 1,
wherein a moisture content ratio is 5.0 mass % or less.

10. A production method for the binder particle aggregate for an electrochemical device electrode according to claim 1, comprising
spray drying a slurry for a binder particle containing a polymer and water, the polymer including 75.0 mol % or more and 99.5 mol % or less of a nitrile group-containing monomer unit.

11. A production method for a slurry composition for an electrochemical device electrode, comprising
mixing the binder particle aggregate for an electrochemical device electrode according to claim 1, an electrode active material, and a solvent.

* * * * *